United States Patent
Kirsche et al.

(10) Patent No.: US 11,710,076 B2
(45) Date of Patent: Jul. 25, 2023

(54) METHOD, APPARATUS, AND COMPUTER PROGRAM PRODUCT FOR MACHINE LEARNING MODEL LIFECYCLE MANAGEMENT

(71) Applicant: Groupon, Inc., Chicago, IL (US)

(72) Inventors: Daniel David Kirsche, Chicago, IL (US); Derrick C. Spell, Oswego, IL (US); Bahador Nooraei Beidokht, Fairfield, CA (US); Xiaohan Zeng, Chicago, IL (US); Lingyong Wang, Evanston, IL (US); Jae Young Chung, Cleveland Heights, OH (US); Andrew Lisy, River Forest, IL (US)

(73) Assignee: GROUPON, INC., Chicago, IL (US)

( * ) Notice: Subject to any disclaimer, the term of this patent is extended or adjusted under 35 U.S.C. 154(b) by 0 days.

(21) Appl. No.: 17/451,695

(22) Filed: Oct. 21, 2021

(65) Prior Publication Data

US 2022/0180248 A1    Jun. 9, 2022

Related U.S. Application Data

(63) Continuation of application No. 16/105,525, filed on Aug. 20, 2018, now Pat. No. 11,182,695.

(Continued)

(51) Int. Cl.
*G06F 17/00* (2019.01)
*G06N 20/00* (2019.01)
(Continued)

(52) U.S. Cl.
CPC ............... *G06N 20/00* (2019.01); *G06F 9/54* (2013.01); *G06F 9/541* (2013.01); *G06N 3/088* (2013.01)

(58) Field of Classification Search
CPC ........ G05B 13/02; G05B 13/04; G05B 13/08; G06N 3/04; G06N 3/08; G06N 5/04; G06N 20/00
(Continued)

(56) References Cited

U.S. PATENT DOCUMENTS 9,996,804 B2 * 6/2018 Bowers ................. G06N 20/00
10,379,502 B2    8/2019 Sharma et al.
(Continued)

OTHER PUBLICATIONS

Spell et al., Flux: Groupon's automated, scalable, extensible machine learning platform, 2017 IEEE International Conference on Big Data (Big Data), Boston, MA, pp. 1554-1559., http://ieeexplore.ieee.org/stamp/stamp.jsp?tp=&arnumber=8258089&isnumber=8257893, Nov. 19, 2018.

(Continued)

*Primary Examiner* — Andy Ho
(74) *Attorney, Agent, or Firm* — Alston & Bird LLP

(57) ABSTRACT

Computing systems, computing apparatuses, computing methods, and computer program products are disclosed for machine learning model lifecycle management. An example computing method includes receiving a machine learning model selection, a machine learning model experiment creation input, a machine learning model experiment run type, and a machine learning model input data path. The example method further includes determining a machine learning model execution engine based on the machine learning model experiment creation input and the machine learning model experiment run type. The example method further includes retrieving input data based on the machine learning model input data path. The example method further includes executing a machine learning model experiment based on the machine learning model execution engine, machine learning model experiment creation input, and the input (Continued)

data. The example method further includes generating one or more machine learning model scores based on the machine learning model experiment.

17 Claims, 25 Drawing Sheets

Related U.S. Application Data

(60) Provisional application No. 62/547,420, filed on Aug. 18, 2017.

(51) Int. Cl.
  *G06F 9/54* (2006.01)
  *G06N 3/088* (2023.01)

(58) Field of Classification Search
  USPC .............................. 703/21, 22; 706/11, 12, 25
  See application file for complete search history.

(56) References Cited

U.S. PATENT DOCUMENTS

| | | | |
|---|---|---|---|
| 10,432,689 B2 | 10/2019 | Taghavi et al. | |
| 10,607,150 B2* | 3/2020 | Sainani | H04L 41/20 |
| 10,810,491 B1 | 10/2020 | Xia et al. | |
| 2014/0358825 A1 | 12/2014 | Phillipps et al. | |
| 2016/0148115 A1* | 5/2016 | Sirosh | G06N 20/00 |
| | | | 706/11 |
| 2017/0017903 A1* | 1/2017 | Gray | G06T 11/60 |
| 2017/0344910 A1* | 11/2017 | Wu | G06F 30/20 |

OTHER PUBLICATIONS

Spell et al., QED: Groupon's ETL management and curated feature catalog system for machine learning, 2016 IEEE International Conference on Big Data (Big Data), Washington, DC, pp. 1639-1646., http://ieeexplore.ieee.org/stamp/stamp.jsp?tp=&arnumber=7840776&isnumber=7840573, Nov. 19, 2018.

* cited by examiner

Goods Own History Forecast

| | |
|---|---|
| Id | 1956e39a-f4b0-47ba-a3eb-2dc4df1d6f84 |
| Permalink | goods-own-history |
| Description | Goods pre-launch forecasting model to predict 30 day demand at sku level, 17 days before the deal goes live |
| Target Variables | forecast |
| Identifiers | product_sku,weeknum |
| Published Exp. Id | |
| Created At | Feb 15th, 2017 16:01-06:00 |
| Created By | xyu@groupon.com |

Experiments

Sell Out

0fce84bd-710a-4719-b715-c9bc75e532ac

Status          RUNNING
Type            BATCH_SCORING
Created At      Fri Jan 13 2017 15:17:06 GMT-0600 (CST)
Execution Id    application_1472176676028_1470575

Input Data      mechanism   hdfs
                path        /user/grp_gdoop_dynami
                            c_pricing/staging/sell
                            -out-model-flux-input-
                            data/extract-2017-01-1
                            3-01-00-05

METHOD, APPARATUS, AND COMPUTER PROGRAM PRODUCT FOR MACHINE LEARNING MODEL LIFECYCLE MANAGEMENT

CROSS-REFERENCE TO RELATED APPLICATIONS

The present application is a continuation of U.S. Non-Provisional application Ser. No. 16/105,525, entitled "Method, Apparatus, And Computer Program Product For Machine Learning Model Lifecycle Management," filed Aug. 20, 2018, which claims priority to U.S. Provisional Application No. 62/547,420, entitled "Method, Apparatus, And Computer Program Product For Machine Learning Model Lifecycle Management," filed Aug. 18, 2017, the contents of each which are incorporated by reference herein in its entirety.

BACKGROUND

The inventors have discovered problems with existing mechanisms for machine learning model lifecycle management. Through applied effort, ingenuity, and innovation, the inventors has solved many of these identified problems by developing solutions embodied by the present disclosure and described in detail below.

BRIEF SUMMARY

Systems, apparatuses, methods, and computer program products are disclosed herein for machine learning model lifecycle management. The machine learning model lifecycle management system provided herein solves the above problems by managing the lifecycle of machine learning models to include the execution and publication of machine learning model experiments and machine learning model scores.

In one example embodiment, a computing system is provided for machine learning model lifecycle management. The computing system may comprise application programming interface (API) circuitry configured to receive a machine learning model selection. The API circuitry may be further configured to receive a machine learning model experiment creation input. The machine learning model experiment creation input may comprise a machine learning model experiment name, a machine learning model experiment description, a machine learning model execution engine selection, at least one machine learning model scoring file, and at least one machine learning model scoring data file. The API circuitry may be further configured to receive a machine learning model experiment run type. The machine learning model experiment run type may be one of batch scoring, real-time scoring, or training. The API circuitry may be further configured to receive a machine learning model input data path. The computing system may comprise machine learning model lifecycle management circuitry configured to determine a machine learning model execution engine based on the machine learning model execution engine selection and the machine learning model experiment run type. The machine learning model lifecycle management circuitry may be further configured to retrieve input data based on the machine learning model input data path. The machine learning model lifecycle management circuitry may be further configured to execute a machine learning model experiment based on the machine learning model execution engine, the machine learning model scoring file, the at least one machine learning model scoring data file, and the input data. The machine learning model lifecycle management circuitry may be further configured to generate one or more machine learning model scores based on the machine learning model experiment. The one or more machine learning model scores may be associated with the machine learning model experiment and the input data.

In another example embodiment, a computing apparatus is provided for machine learning model lifecycle management. The computing apparatus may comprise application programming interface (API) circuitry configured to receive a machine learning model selection. The API circuitry may be further configured to receive a machine learning model experiment creation input. The machine learning model experiment creation input may comprise a machine learning model experiment name, a machine learning model experiment description, a machine learning model execution engine selection, at least one machine learning model scoring file, and at least one machine learning model scoring data file. The API circuitry may be further configured to receive a machine learning model experiment run type. The machine learning model experiment run type may be one of batch scoring, real-time scoring, or training. The API circuitry may be further configured to receive a machine learning model input data path. The computing apparatus may comprise machine learning model lifecycle management circuitry configured to determine a machine learning model execution engine based on the machine learning model execution engine selection and the machine learning model experiment run type. The machine learning model lifecycle management circuitry may be further configured to retrieve input data based on the machine learning model input data path. The machine learning model lifecycle management circuitry may be further configured to execute a machine learning model experiment based on the machine learning model execution engine, the machine learning model scoring file, the at least one machine learning model scoring data file, and the input data. The machine learning model lifecycle management circuitry may be further configured to generate one or more machine learning model scores based on the machine learning model experiment. The one or more machine learning model scores may be associated with the machine learning model experiment and the input data.

In another example embodiment, a computing method is provided for machine learning model lifecycle management. The computing method may comprise receiving, by application programming interface (API) circuitry, a machine learning model selection. The computing method may further comprise receiving, by the API circuitry, a machine learning model experiment creation input. The machine learning model experiment creation input may comprise a machine learning model experiment name, a machine learning model experiment description, a machine learning model execution engine selection, at least one machine learning model scoring file, and at least one machine learning model scoring data file. The computing method may further comprise receiving, by the API circuitry, a machine learning model experiment run type. The machine learning model experiment run type may be one of batch scoring, real-time scoring, or training. The computing method may further comprise receiving, by the API circuitry, a machine learning model input data path. The computing method may further comprise determining, by machine learning model lifecycle management circuitry, a machine learning model execution engine based on the machine learning model execution engine selection and the machine learning model experiment run type. The computing method may further comprise retrieving, by the machine learning model lifecycle management circuitry, input data based on the machine learning model input data path. The computing method may further comprise executing, by the machine learning model lifecycle management circuitry, a machine learning model experiment based on the machine learning model execution engine, the machine learning model scoring file, the at least one machine learning model scoring data file, and the input data. The computing method may further comprise generating, by the machine learning model lifecycle management circuitry, one or more machine learning model scores based on the machine learning model experiment. The one or more machine learning model scores may be associated with the machine learning model experiment and the input data.

In another example embodiment, a computer program product is provided for machine learning model lifecycle management. The computer program product may comprise at least one non-transitory computer-readable storage medium storing computer-executable program code instructions that, when executed by a computing system, cause the computing system to receive, by application programming interface (API) circuitry, a machine learning model selection. The computer-executable program code instructions, when executed by the computing system, may further cause the computing system to receive, by the API circuitry, a machine learning model experiment creation input. The machine learning model experiment creation input may comprise a machine learning model experiment name, a machine learning model experiment description, a machine learning model execution engine selection, at least one machine learning model scoring file, and at least one machine learning model scoring data file. The computer-executable program code instructions, when executed by the computing system, may further cause the computing system to receive, by the API circuitry, a machine learning model experiment run type. The machine learning model experiment run type may be one of batch scoring, real-time scoring, or training. The computer-executable program code instructions, when executed by the computing system, may further cause the computing system to receive, by the API circuitry, a machine learning model input data path. The computer-executable program code instructions, when executed by the computing system, may further cause the computing system to determine, by machine learning model lifecycle management circuitry, a machine learning model execution engine based on the machine learning model execution engine selection and the machine learning model experiment run type. The computer-executable program code instructions, when executed by the computing system, may further cause the computing system to retrieve, by the machine learning model lifecycle management circuitry, input data based on the machine learning model input data path. The computer-executable program code instructions, when executed by the computing system, may further cause the computing system to execute, by the machine learning model lifecycle management circuitry, a machine learning model experiment based on the machine learning model execution engine, the machine learning model scoring file, the at least one machine learning model scoring data file, and the input data. The computer-executable program code instructions, when executed by the computing system, may further cause the computing system to generate, by the machine learning model lifecycle management circuitry, one or more machine learning model scores based on the machine learning model experiment. The one or more machine learning model scores may be associated with the machine learning model experiment and the input data.

The foregoing brief summary is provided merely for purposes of summarizing some example embodiments illustrating some aspects of the present disclosure. Accordingly, it will be appreciated that the above-described embodiments are merely examples and should not be construed to narrow the scope of the present disclosure in any way. It will be appreciated that the scope of the present disclosure encompasses many potential embodiments in addition to those summarized herein, some of which will be described in further detail below.

BRIEF DESCRIPTION OF THE DRAWINGS

The accompanying drawings, which are not necessarily drawn to scale, illustrate embodiments and features of the present disclosure. Together with the specification, including the brief summary above and the detailed description below, the accompanying drawings serve to explain the embodiments and features of the present disclosure. The components illustrated in the figures represent components that may or may not be present in various embodiments or features of the disclosure described herein. Accordingly, some embodiments or features of the present disclosure may include fewer or more components than those shown in the drawings while not departing from the scope of the disclosure.

Figure 9:
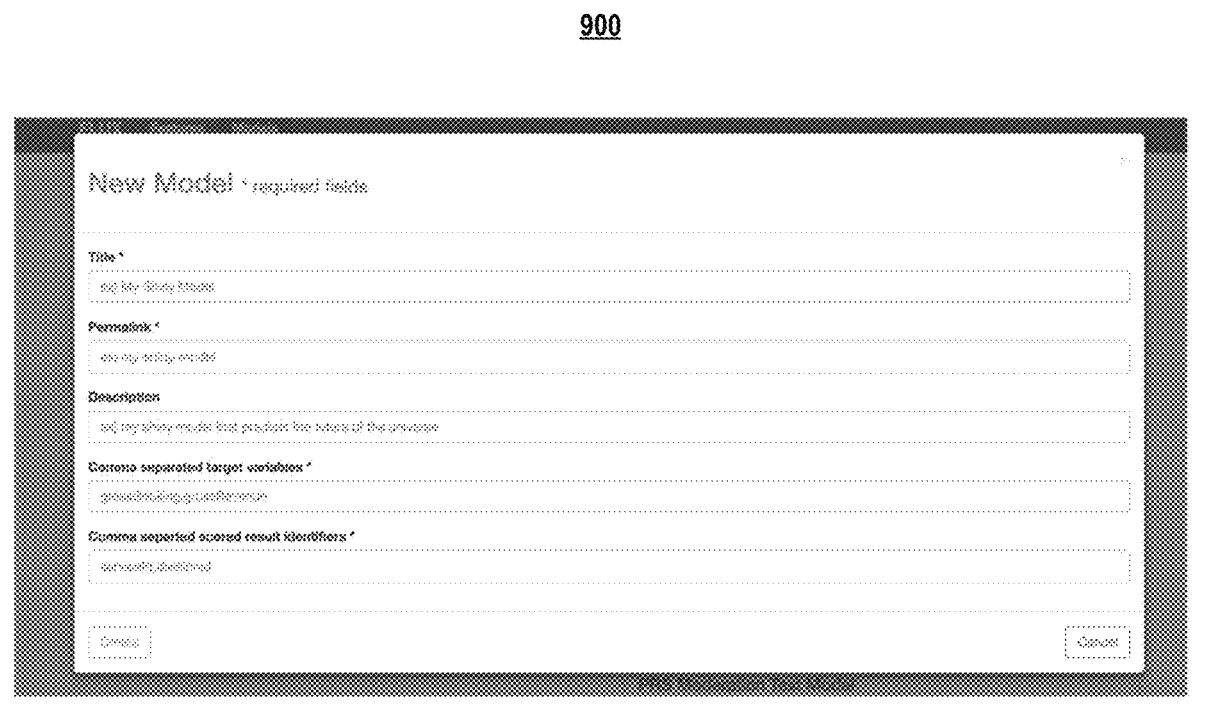

FIG. 9 illustrates an example user interface display screen in accordance with some example embodiments;

FIG. 10 illustrates an example user interface display screen in accordance with some example embodiments;

Figure 11:
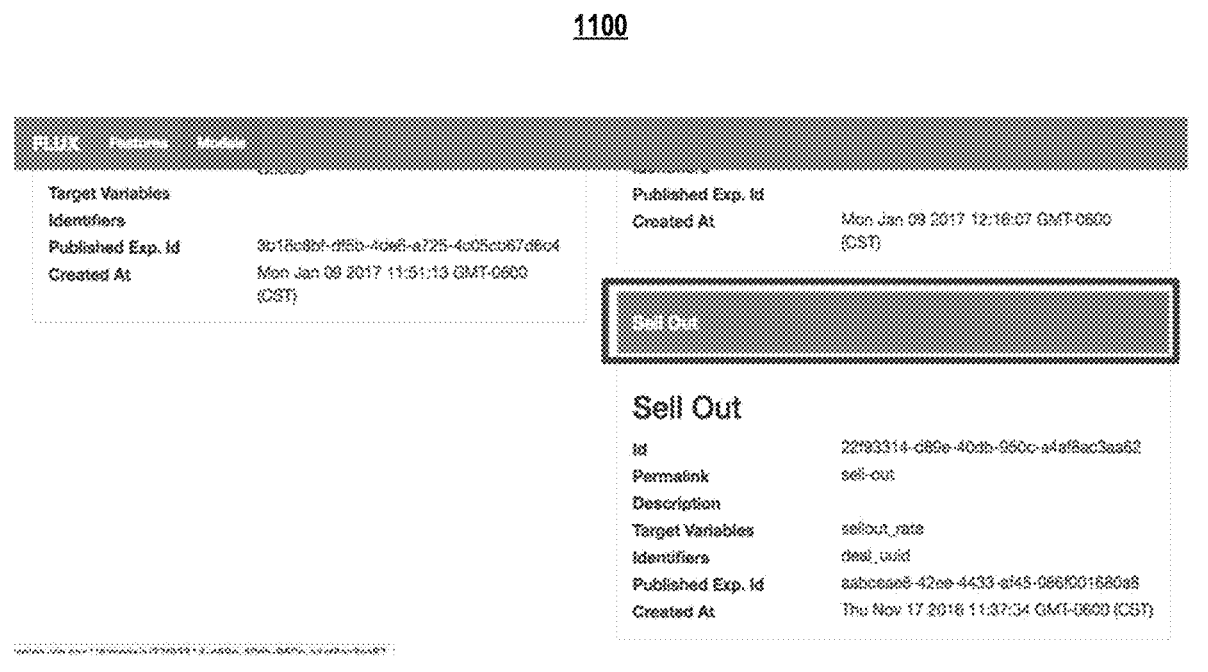

FIG. 11 illustrates an example user interface display screen in accordance with some example embodiments;

Figure 15:
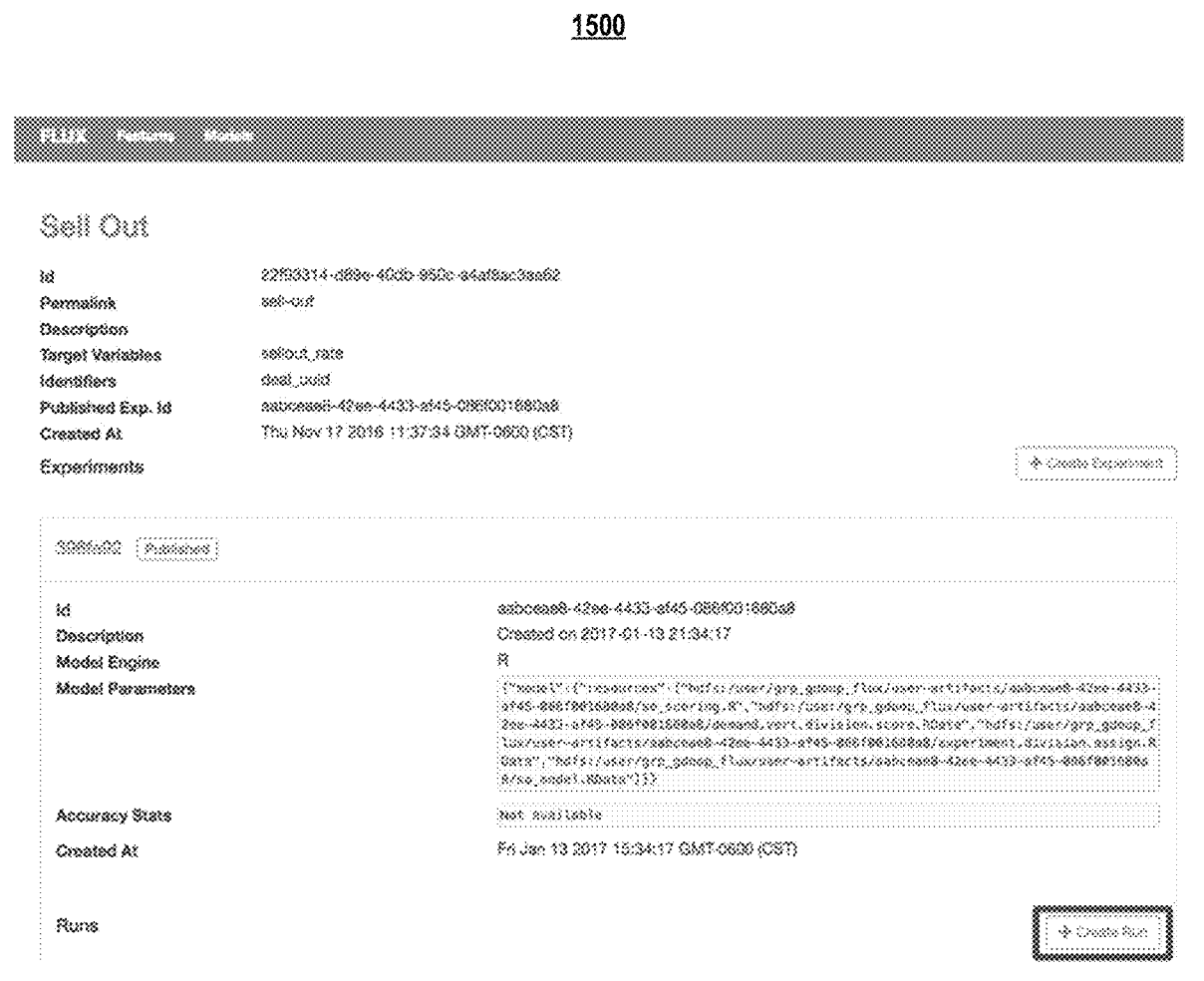

FIG. 15 illustrates an example user interface display screen in accordance with some example embodiments;

FIG. 17 illustrates an example user interface display screen in accordance with some example embodiments;

Figure 19:
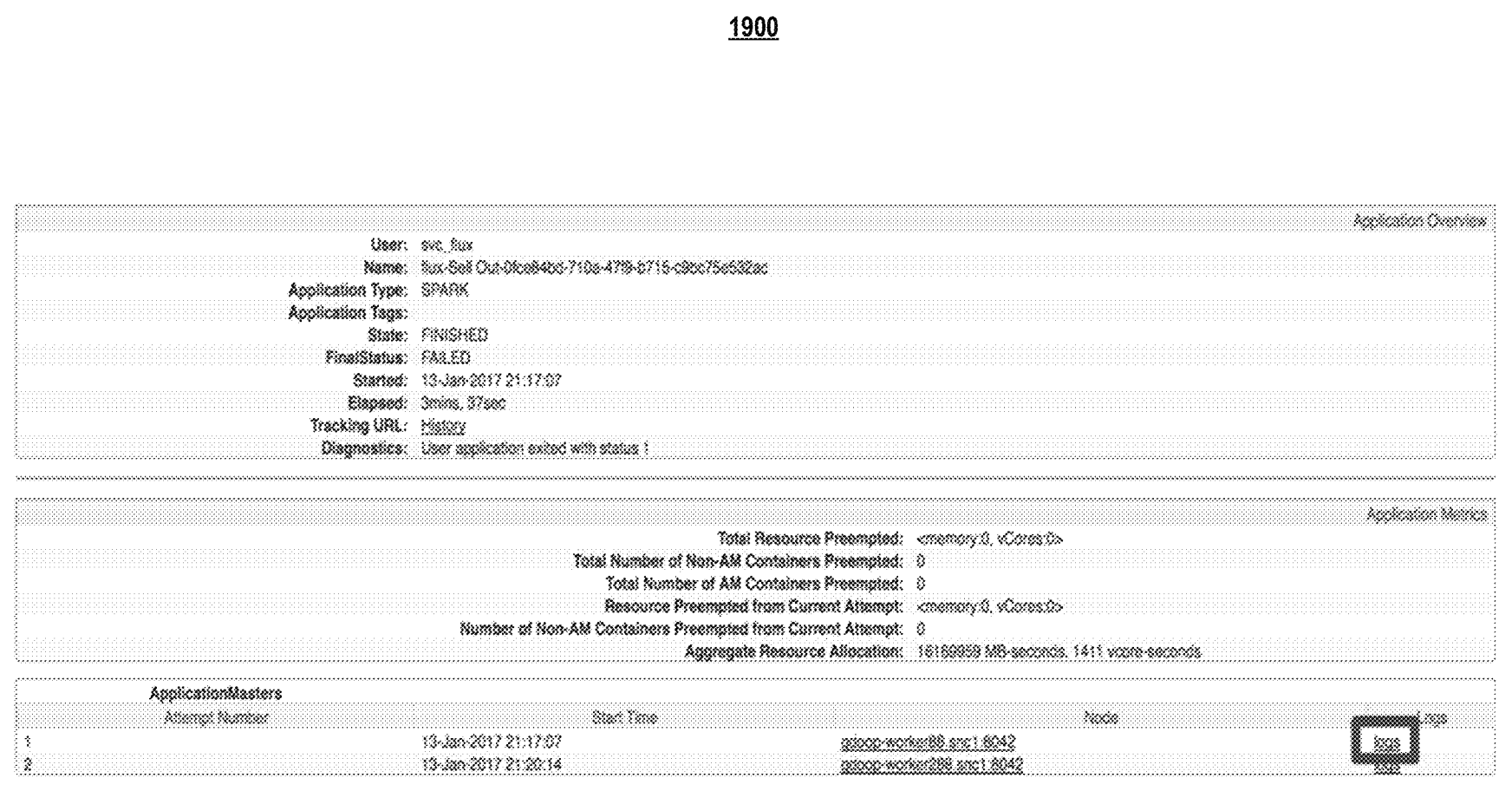

FIG. 19 illustrates an example user interface display screen in accordance with some example embodiments;

FIG. 20 illustrates an example user interface display screen in accordance with some example embodiments; and FIG. 21 illustrates an example user interface display screen in accordance with some example embodiments.

DETAILED DESCRIPTION

Figure 1A:
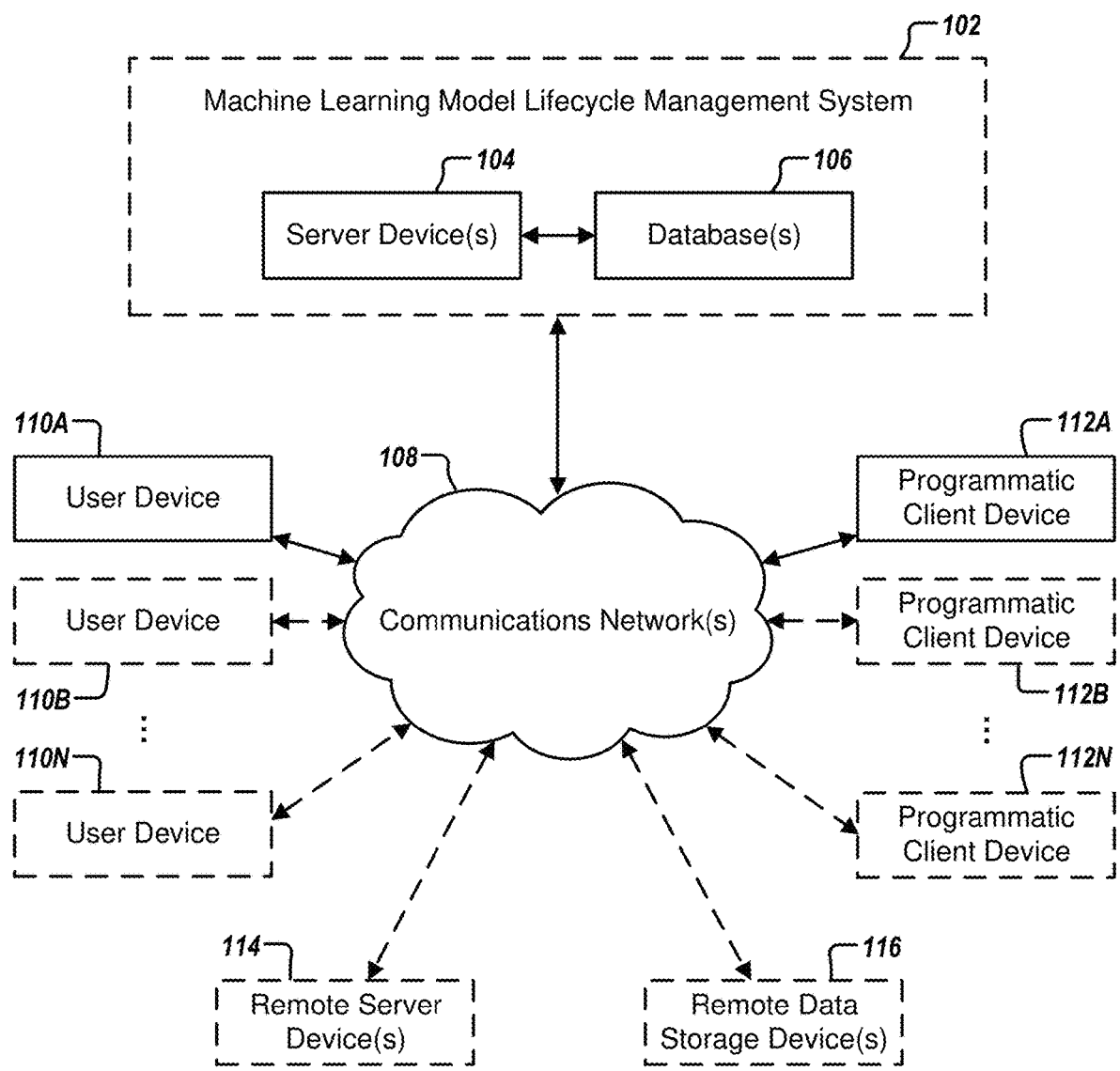
FIG. 1A illustrates an example system diagram in accordance with some example embodiments.

Some embodiments of the present disclosure will now be described more fully hereinafter with reference to the accompanying drawings, in which some, but not all embodiments of the disclosures are shown. Indeed, these disclosures may be embodied in many different forms and should not be construed as limited to the embodiments set forth herein; rather, these embodiments are provided so that this disclosure will satisfy applicable legal requirements. The term "or" is used herein in both the alternative and conjunctive sense, unless otherwise indicated. The terms "illustrative" and "example" are used to be examples with no indication of quality level. Like numbers refer to like elements throughout.

Overview

As noted above, computing systems, computing apparatuses, computing methods, and computer program products are described herein that provide for machine learning model lifecycle management. Machine learning is a subfield of computer science that gives computers the ability to learn without being explicitly programmed. Evolved from the study of pattern recognition and computational learning theory in artificial intelligence, machine learning explores the study and construction of algorithms that may learn from and make predictions on data. Such algorithms overcome following strictly static program instructions by making data-driven predictions or decisions through building a machine learning model from sample inputs. Machine learning is employed in a range of computing tasks where designing and programming explicit algorithms with good performance is difficult or infeasible.

Machine learning enables prediction-making through the use of specialized circuitry, computers, or both. Machine learning may be unsupervised for exploratory data analysis. Machine learning may also be unsupervised and be used to learn and establish baseline behavioral profiles for various entities and then used to find meaningful anomalies. Machine learning is used to devise complex models and algorithms that lend themselves to prediction; also known as predictive analytics. These machine learning models allow researchers, data scientists, engineers, and analysts to produce reliable, repeatable decisions and results, and uncover hidden insights through learning from historical relationships and trends in the data.

Machine learning model lifecycle management involves organizing various experiments for producing a certain prediction. Feedback on the performance of the various experiments must be obtainable at the training phase as well as during and/or from live scoring runs. Based on the performance feedback, the best performing experiments may be selected for use in making programmatic decisions downstream from the machine learning model.

In a production environment, systems downstream from machine learning models make decisions based upon predictions (also referred to herein as "scores") produced by the machine learning models. The downstream systems must be able to trust that the machine learning models have been trained using accurate and reliable data, that the machine learning models have been executed using accurate and reliable data, that the machine learning models are accurate and/or have a high level of historical accuracy, and that the machine learning models have been recently verified to be accurate. The system resources and time allocated to providing such assurances to downstream systems are easily exhausted and compromised as a result of these challenges. The ability to enable data scientists to leverage a scalable architecture to execute machine learning tasks on very large datasets may reduce the computing resources and time necessary to release new machine learning models and/or improvements to existing machine learning models into production.

With the present disclosure, multiple machine learning model experiments may be run simultaneously on very large datasets. Scores or predictions produced by machine learning model experiments may be selectively published for consumption by downstream systems.

Various embodiments of the disclosure generally relate to machine learning model lifecycle management. For example, the systems, apparatuses, methods, and computer program products described herein are operable to receive a machine learning model selection and to receive a machine learning model experiment creation input. The machine learning model creation input comprises a machine learning model experiment name, a machine learning model experiment description, a machine learning model execution engine selection, at least one machine learning model scoring file, and at least one machine learning model scoring data file. The systems, apparatuses, methods, and computer program products described herein are further operable to receive a machine learning model experiment run type and a machine learning model input data path, where the machine learning model experiment run type is one of training or batch scoring. The systems, apparatuses, methods, and computer program products described herein are further operable to execute a machine learning model experiment using the machine learning model scoring file, the at least one machine learning model scoring data file, and input data retrieved from the machine learning model input data path as inputs to a machine learning model execution engine provided by the machine learning model execution engine selection. The systems, apparatuses, methods, and computer program products described herein are further operable to generate one or more machine learning model scores, where the one or more machine learning model scores are associated with the machine learning model experiment and the input data.

In one example embodiment, a computing entity or apparatus is configured to receive a machine learning model selection; receive a machine learning model experiment creation input, the machine learning model creation input comprising a machine learning model experiment name, a machine learning model experiment description, a machine learning model execution engine selection, at least one machine learning model scoring file, and at least one machine learning model scoring data file; receive a machine learning model experiment run type and a machine learning model input data path, wherein the machine learning model experiment run type is one of training or batch scoring; execute a machine learning model experiment using the machine learning model scoring file, the at least one machine learning model scoring data file, and input data retrieved from the machine learning model input data path as inputs to a machine learning model execution engine provided by the machine learning model execution engine selection; and generate one or more machine learning model scores, wherein the one or more machine learning model scores are associated with the machine learning model experiment and the input data.

Other embodiments include corresponding systems, methods, and computer programs, configured to perform the operations of the apparatus, encoded on computer storage devices.

Other embodiments may each optionally include where the at least one machine learning model scoring data file comprises a trained machine learning model.

Other embodiments may each optionally include where the at least one processor and at least one memory including computer program code, the at least one memory and the computer program code configured to, with the at least one processor, further cause the apparatus to: receive a machine learning model experiment publishing selection; and enable access to the machine learning model experiment and the one or more machine learning model scores associated with the machine learning model experiment and the input data.

Other embodiments may each optionally include where executing the machine learning model experiment comprises: retrieving the input data stored in a memory location identified by the machine learning model input data path; loading the at least one machine learning model scoring data file into a machine learning model execution environment, the machine learning model execution environment based on the machine learning model execution engine selection; executing the machine learning model scoring file to create a machine learning model data frame comprising one or more machine learning model scores associated with the machine learning model experiment and the input data.

Other embodiments may each optionally include where the input data comprises a feature vector, the feature vector comprising a most recent observation for each of a plurality of features, each feature identified by a feature identifier and associated with an observation timestamp.

Other embodiments may each optionally include where each score statistic of the one or more machine learning model scores comprises a feature identifier, a score timestamp, a score, and an experiment identifier.

Other embodiments may each optionally include where the trained machine learning model is trained using a machine learning model training dataset, the machine learning model training dataset comprising a plurality of observations of a target variable and a feature vector comprising a plurality of associated observations of non-target variables observed at a time relative to the target variable.

Other embodiments may each optionally include where enabling access to the machine learning model experiment and the one or more machine learning model scores associated with the machine learning model experiment and the input data comprises publishing the machine learning model experiment, the one or more machine learning model scores, and one or more machine learning model statistics in a feature catalog. Other embodiments may each optionally include where the feature catalog comprises a plurality of feature definitions.

There are many advantages of these and other embodiments described herein, such as: providing for integration of offline model prototypes into online production environments in a less time-consuming manner that is also less prone to errors; providing a mechanism that versions the contract between data scientists and engineers, enabling fast iteration while facilitating the maintenance of a stable production environment; supporting, depending on the use case, an offline batch execution or a real-time or streaming paradigm; providing a machine learning system that is easily scalable and able to handle loads that vary drastically in certain scenarios; providing a machine learning system that is extensible and able to onboard new machine learning libraries with ease; providing monitoring and archiving functionalities to enable key activities such as AB testing of models and offline analytics; and expediting the deployment, execution, and monitoring of machine learning models.

Definitions

As used herein, the terms "data," "content," "information," and similar terms may be used interchangeably to refer to data capable of being transmitted, received, and/or stored in accordance with embodiments of the present disclosure. Thus, use of any such terms should not be taken to limit the spirit and scope of embodiments of the present disclosure. Further, where a computing device is described herein to receive data from another computing device, it will be appreciated that the data may be received directly from another computing device or may be received indirectly via one or more intermediary computing devices, such as, for example, one or more servers, relays, routers, network access points, base stations, hosts, and/or the like, sometimes referred to herein as a "network." Similarly, where a computing device is described herein to send data to another computing device, it will be appreciated that the data may be sent directly to another computing device or may be sent indirectly via one or more intermediary computing devices, such as, for example, one or more servers, cloud utilities, relays, routers, network access points, base stations, hosts, and/or the like.

The term "comprising" means including but not limited to, and should be interpreted in the manner it is typically used in the patent context. Use of broader terms such as comprises, includes, and having should be understood to provide support for narrower terms such as consisting of, consisting essentially of, and comprised substantially of.

The phrases "in some embodiments," "in other embodiments," "in some instances," and the like generally mean that the particular feature, structure, or characteristic following the phrase may be included in at least one embodiment of the present disclosure, and may be included in more than one embodiment of the present disclosure (e.g., such phrases may not necessarily refer to the same embodiment).

The word "example" is used herein to mean "serving as an example, instance, or illustration." Any implementation described herein as "example" is not necessarily to be construed as preferred or advantageous over other implementations.

If the specification states a component or feature "may," "can," "could," "should," "typically," "optionally," "generally," "additionally," "alternatively," "for example," "often," or "might" (or other such language) be included or have a characteristic, that particular component or feature is not required to be included or to have the characteristic. Such component or feature may be optionally included in some embodiments, or it may be excluded.

The terms "processor" and "processing circuitry" are used herein to refer to any programmable microprocessor, microcomputer or multiple processor chip or chips that can be configured by software instructions (e.g., applications) to perform a variety of functions, including the functions of the various embodiments described above. In some devices, multiple processors may be provided, such as one processor dedicated to wireless communication functions and one processor dedicated to running other applications. Software applications may be stored in the internal memory before they are accessed and loaded into the processors. The processors may include internal memory sufficient to store the application software instructions. In many devices the internal memory may be a volatile or nonvolatile memory, such as flash memory, or a mixture of both. The memory may also be located internal to another computing resource (e.g., enabling computer-readable instructions to be downloaded over the Internet or another wired or wireless connection).

For the purposes of this description, a general reference to "memory" refers to memory accessible by the processors including internal memory or removable memory plugged into the device, remote memory (e.g., cloud storage), memory within the processors themselves, or a combination thereof. For instance, memory may be any non-transitory computer-readable storage medium having computer-readable instructions (e.g., computer-readable program code instructions) stored thereof that are executable by a processor.

The term "computing device" is used herein to refer to any one or all of programmable logic controllers (PLCs), programmable automation controllers (PACs), industrial computers, desktop computers, personal data assistants (PDAs), laptop computers, tablet computers, smart books, palm-top computers, personal computers, kiosk computers, smartphones, smartwatches, headsets, smart speakers, and similar electronic devices equipped with at least a processor configured to perform the various operations described herein. Computing devices such as smartphones, laptop computers, tablet computers, headsets, and smartwatches are generally referred to herein as mobile devices.

The terms "server" and "server device" are used to refer to any computing device capable of functioning as a server, such as a master exchange server, web server, mail server, document server, or any other type of server. A server may be a dedicated computing device or a computing device including a server module (e.g., an application which may cause the computing device to operate as a server). A server module (e.g., server application) may be a full function server module, or a light or secondary server module (e.g., light or secondary server application) that is configured to provide synchronization services among the dynamic databases on computing devices. A light server or secondary server may be a slimmed-down version of server type functionality that can be implemented on a computing device, such as a smart phone, thereby enabling it to function as an Internet server (e.g., an enterprise e-mail server) only to the extent necessary to provide the functionality described herein.

The terms "circuitry," "module," "utility," and other similar terms should be understood broadly to include hardware. In some embodiments, these terms may also include software for configuring the hardware. For example, in some embodiments, "circuitry" may include processing circuitry, memory, communications circuitry, input-output circuitry, other circuitry, or a combination thereof. In some embodiments, other elements of the present disclosure may provide or supplement the functionality of particular circuitry, modules, or utilities.

The term "client device" refers to computer hardware and/or software that is configured to access a service made available by a server. The server is often (but not always) on another computer system, in which case the client device accesses the service by way of a network. Client devices may include, without limitation, smart phones, tablet computers, laptop computers, wearables, personal computers, enterprise computers, and the like.

As used herein, the terms "user," "client," "consumer," and "customer" may be used interchangeably to refer, without limitation, to a client, customer, purchaser, shopper, user and the like who may be using a client device to receive and interact with a device rendered object.

The term "device rendered object" may be used to refer to a set of executable instructions that, when executed by a processor of a computing device, renders an object for display. An example of a device rendered object may be an instrument of a promotion. The instrument may be any type of gift card, tender, electronic certificate, medium of exchange, voucher, or the like that embodies terms of a promotion from which the instrument resulted and may be used toward at least a portion of the purchase, acquisition, procurement, consumption or the like of goods, services and/or experiences. In some examples, the instrument may take the form of tender that has a given value that is exchangeable for goods, services and/or experiences and/or a reduction in a purchase price of a particular good, service or experience. In some examples, the instrument may have multiple values, such as accepted value, a promotional value, and/or a residual value. In some examples, the accepted value of the instrument is defined by the value exchanged for the instrument. In some examples, the promotional value is defined by the promotion from which the instrument resulted and is the value of the instrument beyond the accepted value. In some examples, the residual value is the value after redemption, the value after the expiration or other violation of a redemption parameter, the return or exchange value of the instrument and/or the like.

In embodiments, each device rendered object has associated data indicating one or more categories (such as a restaurant promotion, a spa promotion, a travel promotion, a local promotion, etc.), sub-categories (such as a sushi restaurant), location, hyper-locations, prices or the like. For example, an object may be associated with a gym, and the gym may be associated with category data such as "beauty, wellness, and healthcare," "food and drink," "leisure offers and activities" and/or "services." A gym may also have more than one location, and may be able to provide promotions in a variety of price ranges and time frames. The device rendered object may be further associated with sub-category data such as "Chinese food" or "Mexican food."

As used herein, the term "device rendered object service" may include a service that is accessible via one or more computing devices and that is operable to provide device rendered object services on behalf of one or more providers that are offering one or more instruments that are redeemable for goods, services, experiences and/or the like. In some examples, the device rendered object service may take the form of a redemption authority, a payment processor, a rewards provider, an entity in a financial network, a promoter, an agent and/or the like. As such, the device rendered object service is, in some example embodiments, configured to present one or more device rendered objects (e.g., promotions) to client devices, accept payments for device rendered objects from client devices, issue instruments upon acceptance of an object, participate in redemption, generate rewards, provide a point of sale device or service, issue payments to providers and/or otherwise participate in the exchange of goods, services or experiences for currency, value and/or the like.

In the present embodiments, device rendered objects may have associated therewith one or more attributes. It should be understood that each of the attributes discussed in this application, may be in some embodiments a primary or a secondary attribute. A list of example attributes is provided below.

In some implementations, one attribute may represent category data, specifically beauty, wellness and healthcare. To determine a normalized value of the one attribute, an algorithm may be executed on associated raw data related to a device rendered object transaction. For example, if the category data associated with a device rendered object transaction is "beauty, wellness and healthcare," the value of the one attribute is 1. If the category data associated with a device rendered object transaction is not "beauty, wellness and healthcare," the value of the one attribute is 0.

In some embodiments, a number of example attributes relate to category data and sub-category data. There is also a number of attributes related to location data. It should be understood that attribute data related to location and hyper location data may be generated in a similar fashion. For example, if the location data associated with a device rendered object transaction is "Chicago," the value of a corresponding attribute may be 1. If the category data associated with a device rendered object transaction is not "Chicago," the value of the corresponding attribute may be 0.

It should also be understood that device rendered object transactions may have associated data indicating one or more categories, sub-categories, location, hyper-locations, prices or the like. For example, a device rendered object transaction may be associated with a gym, and the gym may be associated with category data such as "beauty, wellness, and healthcare," "Food and drink," "Leisure Offers and Activities" and/or "Services." A gym may also have more than one location, and may be able to provide promotions in a variety of price ranges and time frames.

Example attribute data may also be associated with review websites such as Yelp®, Google®, Yahoo®, City Search®, Trip Advisor®. It should be understood that any review website could have associated attribute data, such as for example Zagat®, Bing® or the like. It should also be understood that attribute data associated with reviews related to one or more categories may be generated. For example, a website may provide reviews related to a provider's food, service, décor, price or the like. Attribute data may be generated related to each of one or more categories, such as a provider's food, service, décor, price, or the like.

It should also be understood that a location, hyper-location, category or sub-category may affect data available for the provider of a promotional transaction. For example, device rendered object transactions purchased from providers from different locations (e.g., different countries, states, neighborhoods or the like) may be associated with different attribute data. For example, different countries have different credit reporting rules and agencies. Thus, a promotion and marketing system may utilize a first combination of attributes for a device rendered object transaction from a provider in a first location, hyper-location, category or sub-category and a second combination of attributes for a device rendered object transaction from provider in a second location, hyper-location, category or sub-category.

In one implementation, other attribute data may be used. For example, attribute "bad month" may relate to identifying device rendered object transactions associated with booking months where prior device rendered object transactions have involved products, services, and/or other offerings in one or more categories categorized as having high return rates based on prior performance data. The feature may be normalized such that if the sub-category of the device rendered object transaction is associated with high return rates, the attribute is 1, else the attribute is 0. Other example attributes are "bad market," which may be normalized such that if the device rendered object transaction requires travel to a location and/or hyper local region associated with high return rates, the attribute is 1, else the attribute is 0. Another example feature is "average price for sub-category."

Similar attributes may be clustered, grouped, or aggregated. For example, attributes associated with locations or location based attributes may be grouped under header attribute "location." For example, a division attributes specifying a division where the promotion is offered and an attribute specifying a distance from a center of a city where a promotion is offered may be clustered under the location header attribute. Similarly, attributes associated with "past performance," "category & service," "completion," "maximum capacity," "hero score," "review data" may each also be clustered and/or grouped under header attributes. For example, with respect to device rendered object transaction associated with a merchant providing a service, attributes specifying past performance data may be for (1) the same merchant and the same service, (2) only the same merchant, (3) only the same service may be clustered under attribute header "past performance." Table A shows example attributes.

TABLE A

| Type | Features |
| --- | --- |
| Location | division, distance to city, etc. |
| past performance | same merchant & service, same service, same merchant, etc. |
| category & service | service header, primary deal service, etc. |
| booking month | holiday, pre-holiday, etc. |
| maximum capacity | units_avail, etc. |
| hero score | predicted 30 day bookings, predicted 60 day bookings, etc. |
| review data | yelp_n_review, yelp_rating, yelp_avil, google_n_review, facebook_fans, etc. |

The clustered or the non-clustered attributes may be used to train a machine learning model. It should be understood that the selection of attributes or clusters of attributes for training machine learning models may greatly affect the model performance. In some implementations, attributes and/or clusters of attributes are selected based on statistical analysis. In some implementations, selection of the most significant attributes is based on one or more different attribute selection approaches. These approaches may be (1) forward selection, which is starting with the most significant attributes and incrementally adding a next significant attribute until the model is stable; (2) backward elimination, which starts with all the attributes and exclude the non-significant attributes one by one until the model is stable; (3) a combination of forward selection and backward elimination; and (4) checking the significance of the attribute by statistical model (regression). In one embodiment, each attribute selection approach may give a subset of significant attributes. The attributes that are not shown to be significant by one or more of the attribute selection approaches may be excluded from the model.

As used herein, the terms "provider" and "merchant" may be used interchangeably and may include, but are not limited to, a business owner, consigner, shopkeeper, tradesperson, vendor, operator, entrepreneur, agent, dealer, organization or the like that is in the business of providing a good, service or experience to a consumer, facilitating the provision of a good service or experience to a consumer and/or otherwise operating in the stream of commerce. The "provider" or "merchant" need not actually market a product or service via the device rendered object service, as some merchants or providers may utilize the device rendered object service only for the purpose of gathering client profile information, vector activity information, similarity table information, or the like.

The term "device rendered object interaction" refers to electronic interaction with a device rendered object by a client device. In some examples, the device rendered object interaction may take the form of an accessing or selection of the device rendered object, a viewing of the device rendered object on an electronic display, a scrolling over the device rendered object, a retrieval of the device rendered object, a purchase transaction completed for the device rendered object, and/or the like.

In some embodiments, the interaction data may include various other interactions, including without limitation, scroll-over (e.g., mouse-over) events and durations, the amount of time spent by the client device viewing particular content, the rate at which impressions of particular content result in sales associated with that content, demographic information associated with each particular client using the client device, data indicating other content accessed by the client device (e.g., browser cookie data), the time or date on which content was accessed, the frequency of impressions for particular content, associations between particular clients or client demographics and particular impressions, and/or the like.

The term "device rendered object interaction signal" refers to electronic indication that an interaction as defined above has occurred with respect to a particular device rendered object.

It should be appreciated that the term "programmatically expected" indicates machine prediction of occurrence of certain events.

As used herein, the term "likelihood" refers to a measure of probability for occurrence of a particular event. For example, the likelihood that a client device will interact with a device rendered object may be a value associated with a specific scale. In some implementations, the machine predictions discussed above and below are based, at least in part, on the "likelihood" that an event will occur. Similarly, in some implementations, machine predictions are based on attributes associated with a client profile and/or an associated device rendered object.

The term "R" refers to an open source programming language and software environment for statistical computing and graphics that is supported by the R Foundation for Statistical Computing. The R language is widely used among statisticians and data miners for developing statistical software and data analysis.

The term "Hadoop" refers to an open source software framework used for distributed storage and processing of dataset of big data using the MapReduce programming model. Hadoop includes a storage part (HDFS) and a processing part which is the MapReduce programming model. The term "HDFS" refers to a storage part of the core of Hadoop, known as Hadoop Distributed File System (HDFS). As referred to herein, "Gdoop" is a modified implementation of Hadoop.

Hadoop consists of computer clusters built from commodity hardware. All the modules in Hadoop are designed with a fundamental assumption that hardware failures are common occurrences and should be automatically handled by the framework. Hadoop splits files into large blocks and distributes them across nodes in a cluster. It then transfers packaged code into nodes to process the data in parallel. This approach takes advantage of data locality, where nodes manipulate the data they have access to. This allows the dataset to be processed faster and more efficiently than it would be in a more conventional supercomputer architecture that relies on a parallel file system where computation and data are distributed via high-speed networking.

The term "machine learning model" refers to a machine learning task. A machine learning model comprises a title (e.g., User Lifetime Value) and encompasses one or more target variables.

The term "target variable" refers to a value that a machine learning model is designed to predict. In the present embodiments, historical data is used to train a machine learning model to predict the target variable. Historical observations of the target variable are used for such training.

The term "machine learning model experiment" refers to a method for predicting the target variables that comprise a machine learning model. The machine learning model experiment represents a certain set of features provided to a certain algorithm with a certain set of hyper-parameters. A machine learning model experiment may have associated therewith a machine learning model experiment name and a machine learning model experiment description.

The term "machine learning model selection" refers to an electronic selection of a machine learning model available for inclusion in a machine learning model experiment. A machine learning model selection may be one or more of a touch screen input, mouse click or keyboard entry input provided to a computing device, and the machine learning model selection may be made from a displayed menu of several available machine learning models.

The term "machine learning model name" refers to a string of text and/or numbers are used to identify a machine learning model.

The term "machine learning model experiment description" refers to a plurality of strings of text and/or numbers used to describe a design, notes, functionality, purpose, intention, or other information of a machine learning model experiment.

The term "machine learning model experiment creation input" refers to electronic input provided to a computing device indicating and initiating a creation of a machine learning model experiment.

The term "machine learning model experiment run" refers to an execution of a machine learning model experiment.

The term "machine learning model experiment run type" refers to the type of experiment being run on a machine learning model. A machine learning model experiment run may be of a machine learning model experiment run type, for example, a training run, a batch scoring run, and an always-on streaming run.

The term "machine learning model score" refers to a particular prediction of a value of a target variable produced by the execution of a machine learning model experiment.

Machine learning model execution includes two modules: the machine learning task itself and the context in which the machine learning task is executed. The machine learning task itself may be referred to as the "machine learning model engine" and the execution context may be referred to as the "machine learning model execution engine." Machine learning engine models and machine learning model execution engines represent an area of great volatility within the machine learning model lifecycle management context.

The term "machine learning model engine" refers to mechanisms for training a machine learning model experiment and producing a prediction using the trained artifact. The machine learning model engine encompasses the particular algorithms, libraries, and methods for training and executing machine learning model tasks. Examples of a machine learning model engine include R, Foundry, or an implementation in Java. Machine learning model engines, according to the present embodiments, deliver performance metrics generated during training runs. The performance metrics may be dependent upon the particular machine learning model engine and a particular chosen algorithm employed by the machine learning model.

The term "machine learning model execution engine" refers to an execution context in which a machine learning model engine is executed. Examples of a machine learning model execution engine include executing a PySpark job on Hadoop or executing a Java scoring job on a cluster. Other examples of machine learning model execution engines include exercising a machine learning model within a MapReduce job over an HDFS file, and exercising a machine learning model by feeding tuples read from a Kafka stream. Another example of a machine learning model execution engine includes exposing a machine learning model via a REST endpoint, allowing for ad-hoc, on demand scoring. In embodiments, when a machine learning model is scored by a machine learning model execution engine, the scores produced by the machine learning model are collected and compared to later real observations of the target variable to provide metrics on machine learning model performance. By comparing predictions (or scores) to actual measurements, the present embodiments provide error and correlation metrics.

The term "machine learning model engine selection" refers to an electronic selection of a machine learning model engine for executing a machine learning model experiment. A machine learning model engine selection may be one or more of a touch screen input, mouse click or keyboard entry input provided to a computing device.

The term "machine learning model experiment publishing selection" refers to an electronic selection of an option to publish a machine learning model experiment and associated data. A machine learning model experiment publishing selection may be one or more of a touch screen input, mouse click or keyboard entry input provided to a computing device.

The term "machine learning model execution environment" refers to an environment providing the execution context, or machine learning model execution engine, for executing a machine learning model engine.

The term "dataset" refers to a collection of data. A dataset may correspond to the contents of a single database table, or a single statistical data matrix, where every column of the table represents a particular variable, and each row corresponds to a given member of the dataset in question. The dataset may be comprised of tuples.

Inherent to every machine learning model is the schema of the dataset the machine learning model expects. In the present system, a dataset is defined separate from a machine learning model engine associated with a machine learning model experiment. The dataset is delivered to the machine learning model engine by the machine learning model execution engine. This enables the same machine learning model experiment source code to operate in a batch mode, a streaming mode, or a real-time mode.

In the present embodiments, dataset generation is decoupled from machine learning model execution. This enables reuse of generated datasets by different machine learning model experiments and by different machine learning models.

The terms "user interface" and "UI" refer to a programmatic display for enabling the interaction between humans and a computing device. The goal of user interface design is to produce a user interface which makes it easy (e.g., self-explanatory), efficient, and enjoyable (e.g., user-friendly) to operate a computing device in a way which produces a desired result. This generally means that the operator needs to provide minimal input to achieve the desired output, and also that the computing device minimizes undesired outputs to the human. In the present embodiments, performance metrics may be displayed using a user interface. In addition, scoring statistics may be gathered and when machine learning model performance crosses a particular threshold an alert may be displayed on the user interface. In the present embodiments, a user interface may provide visual display of machine learning model execution run status in real-time.

The term "API" refers to an Application Programming Interface (API), which is a set of subroutine definitions, protocols, and tools for building application software. An API is a set of clearly defined methods of communication between various software components. An API may be for a web-based system, operating system, database system, computer hardware or software library. An API specification may take many forms, but often includes specifications for routines, data structures, object classes, variables or remote calls. POSIX, Microsoft Windows API, the C++ Standard Template Library and Java APIs are examples of different forms of APIs.

The terms "feature" and "features" refer to aggregations of raw data representing device rendered object interactions (e.g., transactions, clicks, computing device engagement) rolled up to an entity and combined with attributes of the entity. In the present embodiments, supervised learning tasks use features. In the present embodiments, each feature has associated therewith a "feature identifier" comprising text and/or numbers for uniquely identifying the feature.

The term "feature catalog" refers to a digital repository that maintains definitions of features and datasets.

The term "feature vector" refers to a vector comprising a plurality of features. In the present embodiments, values in a feature vector are observed some time X before a value of the target variable was observed. The value X may be a standard offset or it may be dynamically generated based on when the target variable was observed.

The term "DaaS" refers to data as a service. DaaS builds on the concept that data may be provided on demand.

The terms "model parameter" and "model parameters" refer to properties of data that is a part of the training dataset that are learned during training by a model classifier or other machine learning model. For example in case of a natural language processing (NLP) task: word frequency, sentence length, noun or verb distribution per sentence, the number of specific character n-grams per word, lexical diversity, etc. In the present embodiments, model parameters differ for each experiment and depend on the type of data and task at hand.

The terms "model hyper-parameter" and "model hyper-parameters" refer to properties of data that is part of the training dataset that are common for similar machine learning models and cannot be learned during training but are established or defined beforehand. A typical set of hyper-parameters for neural networks includes the number and size of the hidden layers, weight initialization scheme, learning rate and its decay, dropout and gradient clipping threshold, etc.

The term "simultaneously" refers to a relation between two events happening at relatively the same time during a time frame of reference.

The terms "REST API" and "RESTful API" refer to web service APIs that adhere to the REST architectural constraints. HTTP-based RESTful APIs are defined with the following aspects: base URL, such as http://api.example.com/resources/; an internet media type that defines state transition data elements (tells the client how to compose requests for transitions to all the next available application states; could be as simple as a URL or as complex as a Java applet); and standard HTTP methods (e.g., OPTIONS, GET, PUT, POST, and DELETE).

The term "performance metrics" refers to collected data and comparisons representing behavior of a machine learning model. For example, the performance metrics of a machine learning model may provide a measure of a level of accuracy of the predictions provided by the machine learning model.

The term "machine learning model scoring data file" refers to a file containing a trained machine learning model that is to be scored using embodiments of the present disclosure.

The term "machine learning model scoring file" refers to a script that when executed scores a trained machine learning model contained in a machine learning model scoring data file and provides an output data frame containing results of the scoring.

The terms "input data" and "input data frame" refer to a set of data that is used for scoring a trained machine learning model.

The term "memory location" refers to a location in a digital repository.

The term "machine learning model input data path" refers to a memory location at which machine learning model input data is stored and accessible.

The term "machine learning model data frame" refers to data output from a scoring operation.

The term "observation timestamp" refers to a captured instance of network time associated with when an observation was made and stored.

The term "score timestamp" refers to a captured instance of network time associated with when scored was calculated/generated and stored The terms "observation" and "observations" refer to an acquisition of an instance value of a variable at a given point in time (e.g., network time).

The term "recent observation" refers to the last observation of a variable that was captured and stored.

The term "historical observation" refers to past observations of a variable that were captured and stored. For example, an observation that was captured before the most recent observation may be referred to as a historical observation.

The tem "associated observations" refers to observations of variables other than the target variable that are captured at the same time as a particular observation of the target variable The term "non-target variables" refers to variables other than the target variable.

The term "access" refers to the ability to retrieve any piece of data electronically from a digital repository.

It should be appreciated that the term "subset" describes a proper subset. A proper subset of set is portion of the set that is not equal to the set. For example, if elements A, B, and C belong to a first set, a subset including elements A and B is a proper subset of the first set. However, a subset including elements A, B, and C is not a proper subset of the first set.

Having set forth a series of definitions called-upon throughout this application, an example system architecture is described below for implementing example embodiments and features of the present disclosure.

System Architecture

Methods, systems, apparatuses, and computer program products of the present disclosure may be embodied by any of a variety of devices. For example, the system, apparatus, method, and computer program product of an example embodiment may be embodied by a networked device, such as one or more servers, remote servers, cloud-based servers (e.g., cloud utilities), or other network entities, configured to communicate with one or more devices, such as one or more data storage devices, user devices, or a combination thereof. Example embodiments of the user devices include any of a variety of stationary or mobile computing devices, such as a smartphone, laptop computer, tablet computer, desktop computer, electronic workstation, or any combination of the aforementioned devices.

FIGS. 1A-1D illustrate example environments of example systems of example sets of devices and circuitries that may be involved in some example embodiments described herein. In this regard, FIG. 1A discloses an example environment 100 within which embodiments of the present disclosure may operate to manage machine learning model lifecycles. As illustrated, a machine learning model lifecycle management system 102 may be connected to one or more server devices 104 in communication with one or more databases 106. The machine learning model lifecycle management system 102 may be connected to one or more user devices 110, one or more programmatic client devices 112, one or more remote server devices 114, and one or more remote data storage devices 116 through one or more communications networks 108. In some embodiments, one or more communications networks 108 may comprise the Internet; Ethernet; a wireless local area network (LAN); a virtual private network (VPN); a cellular network; a satellite network; a proximity-based network; a wireless personal area network (PAN), any other suitable communications network; or any combination thereof. In some embodiments, the machine learning model lifecycle management system 102 may be configured to manage the lifecycles of machine learning models as described in further detail below.

The machine learning model lifecycle management system 102 may be embodied as one or more circuitries, computers, or computing systems as described herein. The one or more server devices 104 may be embodied as one or more servers, remote servers, cloud-based servers (e.g., cloud utilities), circuitries, processors, or any other suitable server devices, or any combination thereof. The one or more server devices 104 receive, process, generate, and transmit data, signals, content, and electronic information to facilitate the operations of the machine learning model lifecycle management system 102.

The one or more databases 106 may be embodied as one or more data storage devices, such as a Network Attached Storage (NAS) device or devices, or as one or more separate databases or servers. In some embodiments, the one or more databases 106 may be configured to provide DaaS. The one or more databases 106 include information accessed and stored by the machine learning model lifecycle management system 102 to facilitate the operations of the machine learning model lifecycle management system 102. For example, the one or more databases 106 may store machine learning model selections, machine learning model experiment creation input (e.g., comprising, but not limited to, machine learning model experiment names, machine learning model experiment descriptions, machine learning model execution engine selections, machine learning model scoring files, and machine learning model scoring data files), machine learning model experiment run types (e.g., batch scoring, real-time scoring, training), machine learning model input data paths, machine learning model scores, machine learning model statistics (e.g., comprising, but not limited to, feature identifiers, score timestamps, scores, and experiment identifiers), machine learning model experiment publishing selections, machine learning model training datasets (e.g., comprising, but not limited to, observations of target variables, and feature vectors comprising associated observations of non-target variables observed at times relative to the target variables), feature catalogs (e.g., comprising, but not limited to, feature definitions), UI data and content, machine learning model prediction data, any other suitable data or electronic information, or any combination thereof. In some embodiments, the one or more databases 106 may store user account credentials for users of one or more user devices 110A-110N, one or more programmatic client devices 112A-112N, remote server devices 114, remote data storage devices 116, or a combination thereof. In some embodiments, the one or more databases 106 may store data regarding device characteristics of one or more user devices 110A-110N, one or more programmatic client devices 112A-112N, remote server devices 114, remote data storage devices 116, or a combination thereof.

The one or more user devices 110A-110N may be embodied by one or more computing devices, such as one or more "human clients" (e.g., client devices operable by humans). Information received by the machine learning model lifecycle management system 102 from the one or more user devices 110A-110N may be provided in various forms and via various methods. For example, the one or more user devices 110A-110N may be laptop computers, smartphones, netbooks, tablet computers, wearable devices, desktop computers, electronic workstations, or the like, and the information may be provided through various modes of data transmission provided by these user devices. In some embodiments, users may use one or more user devices 110A-110N to input data and generate interaction data. The machine learning model lifecycle management system 102, one or more remote server devices 114, or a combination thereof may receive the data, or electronic information indicative of the data, directly or indirectly from the one or more user devices 110A-110N. The machine learning model lifecycle management system 102, one or more remote server devices 114, or a combination thereof may transmit UI data, or electronic information indicative of the UI data, directly or indirectly to the one or more user devices 110A-110N for display on a display screen communicatively connected to the one or more user devices 110A-110N. In some embodiments, users may use one or more user devices 110A-110N to display UI data, input data, and facilitate other operations of the machine learning model lifecycle management system 102.

The one or more programmatic client devices 112A-112N may be embodied by one or more computing devices, servers, or cloud utilities. Information received by the machine learning model lifecycle management system 102 from the one or more programmatic client devices 112A-112N may be provided in various forms and via various methods. For example, the one or more programmatic client devices 112A-112N may be servers, cloud utilities, laptop computers, smartphones, netbooks, tablet computers, wearable devices, desktop computers, electronic workstations, or the like, and the information may be provided through various modes of data transmission provided by these user devices. In some embodiments, one or more programmatic client devices 112A-112N may be configured to receive, generate, store, and transmit data as a client service. The machine learning model lifecycle management system 102, one or more remote server devices 114, or a combination thereof may receive data directly or indirectly from, or transmit data directly or indirectly to, the one or more programmatic client devices 112A-112N.

In embodiments where a user device 110A-110N or a programmatic client device 112A-112N is a mobile device, such as a smartphone or tablet, the mobile device may execute an "app" (e.g., a thin-client application) to interact with the machine learning model lifecycle management system 102, the one or more remote servers, the one or more remote data storage devices 116, or a combination thereof. Such apps are typically designed to execute on mobile devices, such as tablets or smartphones. For example, an app may be provided that executes on mobile device operating systems such as Apple Inc.'s iOS, Google LLC's Android®, or Microsoft Corporation's Windows®. These platforms typically provide frameworks that allow apps to communicate with one another and with particular hardware and software components of mobile devices. For example, the mobile operating systems named above each provide frameworks for interacting with location services circuitry, wired and wireless network interfaces, user contacts, and other applications in a manner that allows for improved interactions between apps while also preserving the privacy and security of individual users. In some embodiments, a mobile operating system may also provide for improved communications interfaces for interacting with external devices (e.g., user devices, programmatic client devices, data storage devices). Communication with hardware and software modules executing outside of the app is typically provided via APIs provided by the mobile device operating system.

The one or more remote server devices 114 may be embodied by any suitable computing device. In some embodiments, the one or more remote server devices 114 may be embodied as one or more servers, remote servers, cloud-based servers (e.g., cloud utilities), processors, or any other suitable devices, or any combination thereof. In some embodiments, the one or more remote server devices 114 may be embodied as one or more Gdoop processing devices, such as one or more Spark clusters or Gdoop resource managers. In some embodiments, the one or more remote server devices 114 may receive, process, store, generate, and transmit data, signals, and electronic information to facilitate the operations of the machine learning model lifecycle management system 102. Information received by the machine learning model lifecycle management system 102 from one or more remote server devices 114 may be provided in various forms and via various methods. It will be understood, however, that in some embodiments, the one or more remote server devices 114 need not themselves be servers, but may be peripheral devices communicatively coupled to servers.

The one or more remote data storage devices 116 may be embodied by any suitable computing device. In some embodiments, the one or more remote data storage devices 116 may be embodied as one or more NAS devices, or as one or more separate databases or database servers. In some embodiments, the one or more remote data storage devices 116 may be embodied as one or more Gdoop storage devices, such as HDFS. In some embodiments, the one or more remote data storage devices 116 may receive, process, store, generate, and transmit data, signals, and electronic information to facilitate the operations of the machine learning model lifecycle management system 102. For example, the one or more remote data storage devices 116 may store artifacts (e.g., trained artifacts, execution artifacts). Information received by the machine learning model lifecycle management system 102 from one or more remote data storage devices 116 may be provided in various forms and via various methods. It will be understood, however, that in some embodiments, the one or more remote data storage devices 116 need not themselves be databases or database servers, but may be peripheral devices communicatively coupled to databases or database servers.

Additionally or alternatively, the one or more user devices 110A-110N, the one or more programmatic client devices 112A-112N, the one or more remote server devices 114, the one or more remote data storage devices 116, or any combination thereof may interact with the machine learning model lifecycle management system 102 over one or more communications networks 108. As yet another example, the one or more user devices 110A-110N, the one or more programmatic client devices 112A-112N, the one or more remote server devices 114, the one or more remote data storage devices 116, or any combination thereof may include various hardware or firmware designed to interface with the machine learning model lifecycle management system 102. For example, an example user device 110A may be a user's laptop and may have an application stored thereon facilitating communication with the machine learning model lifecycle management system 102, whereas another example user device 110B may be a user's smartphone and may have another application stored thereon facilitating communication with the machine learning model lifecycle management system 102. As yet another example, an example programmatic client device 112A may be a data scientist's computing device and may have an application stored thereon facilitating communication with the machine learning model lifecycle management system 102, whereas another example programmatic client device 112A-112N may be a purpose-built device offered for the primary purpose of communicating with the machine learning model lifecycle management system 102. As yet another example, a plurality of example remote server devices 114 and example remote data storage devices 116 may operate together as a Hadoop cluster configured to communicate with the machine learning model lifecycle management system 102.

Figure 1B:
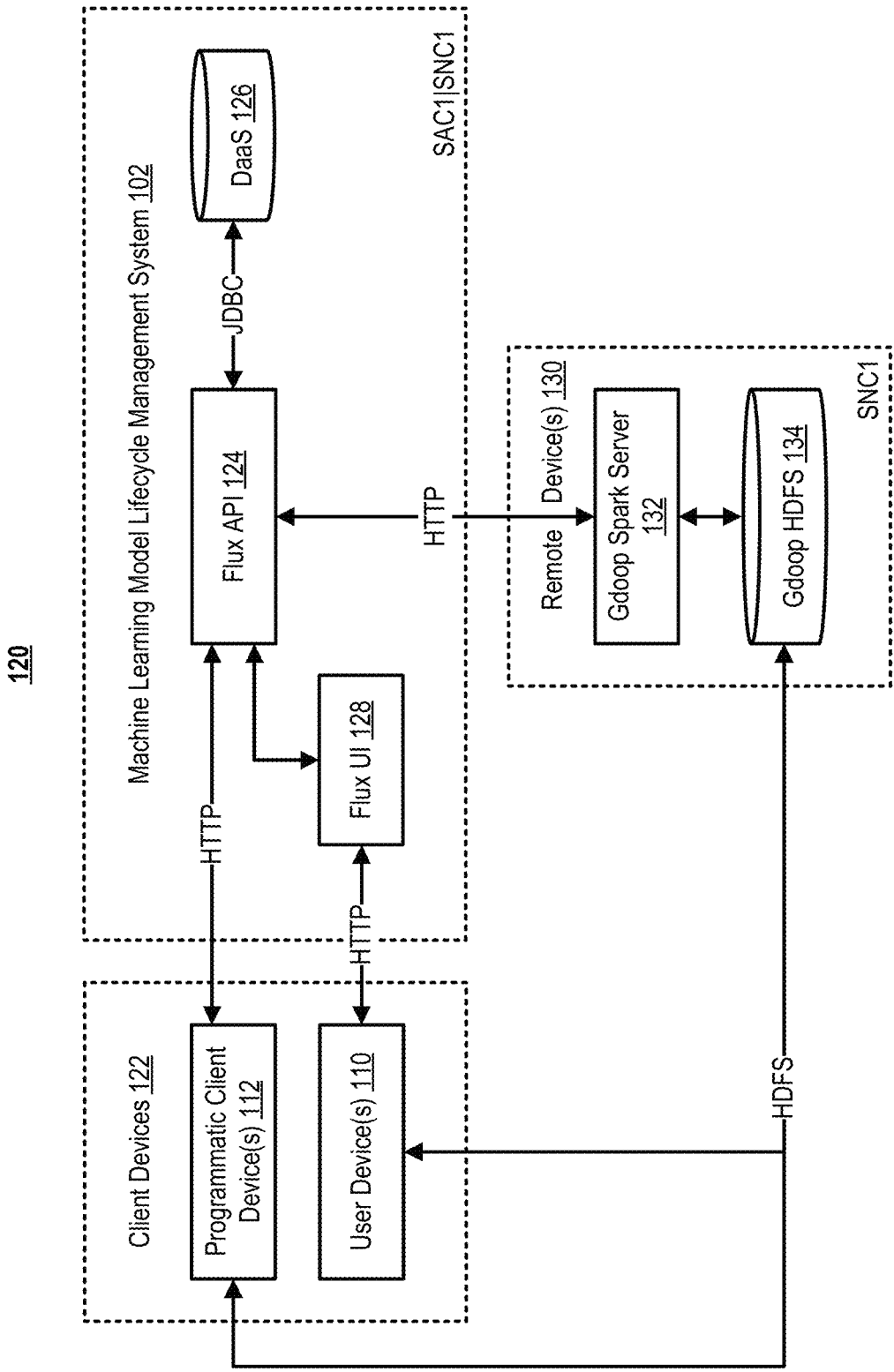
FIG. 1B illustrates an example logical design diagram of a system in accordance with some example embodiments.
Figure 1C:
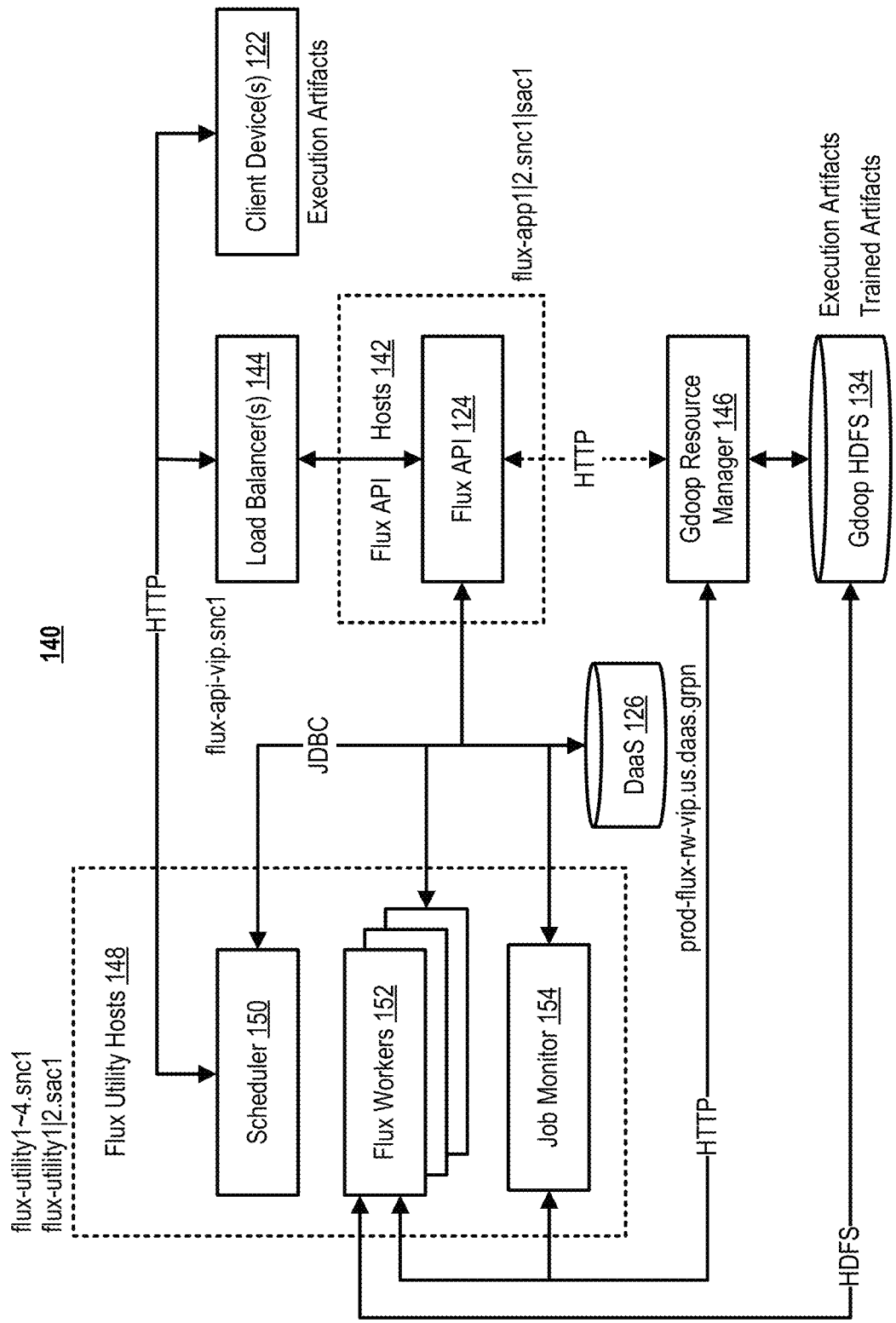
FIG. 1C illustrates an example design diagram of a system in accordance with some example embodiments.

FIG. 1B illustrates an example logical design diagram of an example environment 120 comprising a machine learning model lifecycle management system 102 in accordance with some example embodiments. Machine learning model lifecycle management system 102 enables handling, through a Flux API 124, incoming requests from one or more client devices 122 (e.g., one or more programmatic client devices 112, one or more user devices 110, or a combination thereof). One or more client devices 122 may access machine learning model lifecycle management system 102 via a communications network (not shown) (e.g., one or more communications networks 108, the Internet, LAN, WAN, or the like) using computing devices. A user device 110 may interact with Flux API 124 through a Flux UI 128. The machine learning model lifecycle management system 102 may be configured to receive requests (e.g., comprising input data) from client devices 122, generate corresponding machine learning model lifecycle records based on the received requests, and store the generated machine learning model lifecycle records in DaaS 126. Accordingly, embodiments of the present disclosure enable creation of corresponding records of a machine learning model lifecycle (models themselves, experiments around the models, and executions of the experiments) that result from handling the incoming requests.

In some embodiments, example environment 120 may comprise one or more remote devices 130 comprising Gdoop Spark server 132 and Gdoop HDFS 134. Flux API 124 may access one or more remote devices 130 via a communications network (not shown) (e.g., one or more communications networks 108, the Internet, LAN, WAN, or the like).

In some embodiments, example environment 120 may comprise multiple execution engines configured to invoke the training or scoring with a given set of machine learning model parameters on a specific technology stack, such as R models on Gdoop Spark server 132 or Scikit on Spark Streaming, and the like. Execution artifacts that specify execution parameters (R scripts or machine learning model scoring files needed for running a machine learning model, R trained model data file or machine learning scoring data files, etc.) are uploaded from the client devices 122 via Flux API 124 and stored at Gdoop HDFS 134 and the memory location of the artifacts in Gdoop HDFS 134 is stored as metadata in DaaS 126. Alternatively, artifacts may be stored in a database (not shown) and uploaded to Gdoop HDFS 134 as execution is about to happen.

Flux API 124, execution engines (e.g., Gdoop Spark server 132), and associated processing modules may be implemented as embodied as one or more circuitries, processors, memories, computers, or a combination thereof. The Gdoop Spark server 132 may provide for receiving of electronic data from various sources, including but not necessarily limited to the client devices 122. Example environment 120 may further comprise a database (not shown) to facilitate the operations of the machine learning model lifecycle management system 102. The database may be embodied as one or more databases or data storage devices, such as one or more databases 106, remote data storage devices 116, Network Attached Storage (NAS) device, or a combination thereof, or as a separate database server or servers. The database may comprise information accessed and stored by the Flux API 124, Flux UI 128, Gdoop Spark server 132, or any other suitable device or circuitry to facilitate the operations of the machine learning model lifecycle management system 102.

FIG. 1B illustrates an example design diagram of an example environment 140 comprising one or more client devices 122, one or more load balancers 144, one or more Flux API hosts 142, one or more Flux utility hosts 148, DaaS 126, Gdoop Resource Manager 146, and Gdoop HDFS 134 in accordance with some example embodiments. Flux API hosts 142 may comprise Flux API 124. Flux utility hosts 148 may comprise a scheduler 150, one or more Flux workers 152, and a job monitor 154.

In some embodiments, the machine learning model lifecycle management system uploads execution artifacts that specify execution parameters (R scripts or machine learning model scoring files needed for running a machine learning model, R trained model data file or machine learning scoring data files, etc.) from the one or more client devices 122 via Flux API 124 and stores the execution artifacts at Gdoop HDFS 134. The machine learning model lifecycle management system may store the memory location of the execution artifacts in Gdoop HDFS 134 as metadata in DaaS 126. Alternatively, machine learning model lifecycle management system may store the execution artifacts in a database (not shown) and upload the execution artifacts to Gdoop HDFS 134 as execution is about to happen.

In some embodiments, the machine learning model lifecycle management system uploads trained artifacts (e.g., the trained model artifacts, such as R model binary, that are generated from Flux worker 152 runs) to Gdoop HDFS 134, indexed by a corresponding machine learning model execution identifier. Client devices 122 may later look up a machine learning model, then a desired machine learning model experiment (associated with the machine learning model), then a desired machine learning model experiment run instance (associated with the machine learning model experiment) and retrieve the dataset location of the output. It will be appreciated that a machine learning model experiment may have multiple runs by varying the score input set; in some instances, it will be up to the client to find the correct run instance to consume the result from.

In some embodiments, Flux API hosts 142 provides APIs (e.g., Flux API 124) to manage machine learning model lifecycle to client devices over REST APIs. For example, fronted by a load balancer 144, Flux API 124 may communicate with DaaS 126 to store the internal data about the requests received around machine learning model lifecycle management. In some embodiments, Flux API 124 may submit run jobs directly to Gdoop resource manager 146. Execution status is able to be queried via a REST API to find out the completion status of the request.

In some embodiments, Flux workers 152 submit jobs to Gdoop resource manager 146, leaving the Flux API 124 to orchestrate the incoming model lifecycle management requests to suitable work units to be carried out by the Flux workers 152.

In some embodiments, job monitor 154 may periodically connect to DaaS 126 to retrieve a list of jobs that are currently in RUNNING state and retrieve their corresponding Hadoop application ID handle. Job monitor 154 may then connect to Gdoop resource manager 146 to retrieve the state of the Gdoop execution and update the state in DaaS 126 directly.

In some embodiments, a scheduler 150 may submit jobs to Flux API 124 based on a schedule defined to execute a machine learning model experiment on schedule.

In some embodiments, Flux workers 152 may pick-up runs that are in READY TO RUN states and launch the execution using the proper execution engines (e.g., in accordance with, in some instances, Table B below). In some embodiments, this process may result in a cutoff of direct communication between Flux API 124 and Gdoop resource manager 146. Instead, Flux API 124 writes the runs in states such that the Flux workers 152 may pick up these requests. The Flux workers 152 are light weight meaning that the Flux workers 152 are configured to pick up the job and launch respective backend processing on different execution engines (e.g., PySpark job on Gdoop or Java scoring job on cluster). Hence Flux workers 152 may be run on the same hosts as the Flux API hosts 142. However, it may be preferable to keep the process space separated between the Flux API 124 and the Flux workers 152, so that the Flux workers 152 do not slow down the Flux API 124.

Figure 1D:
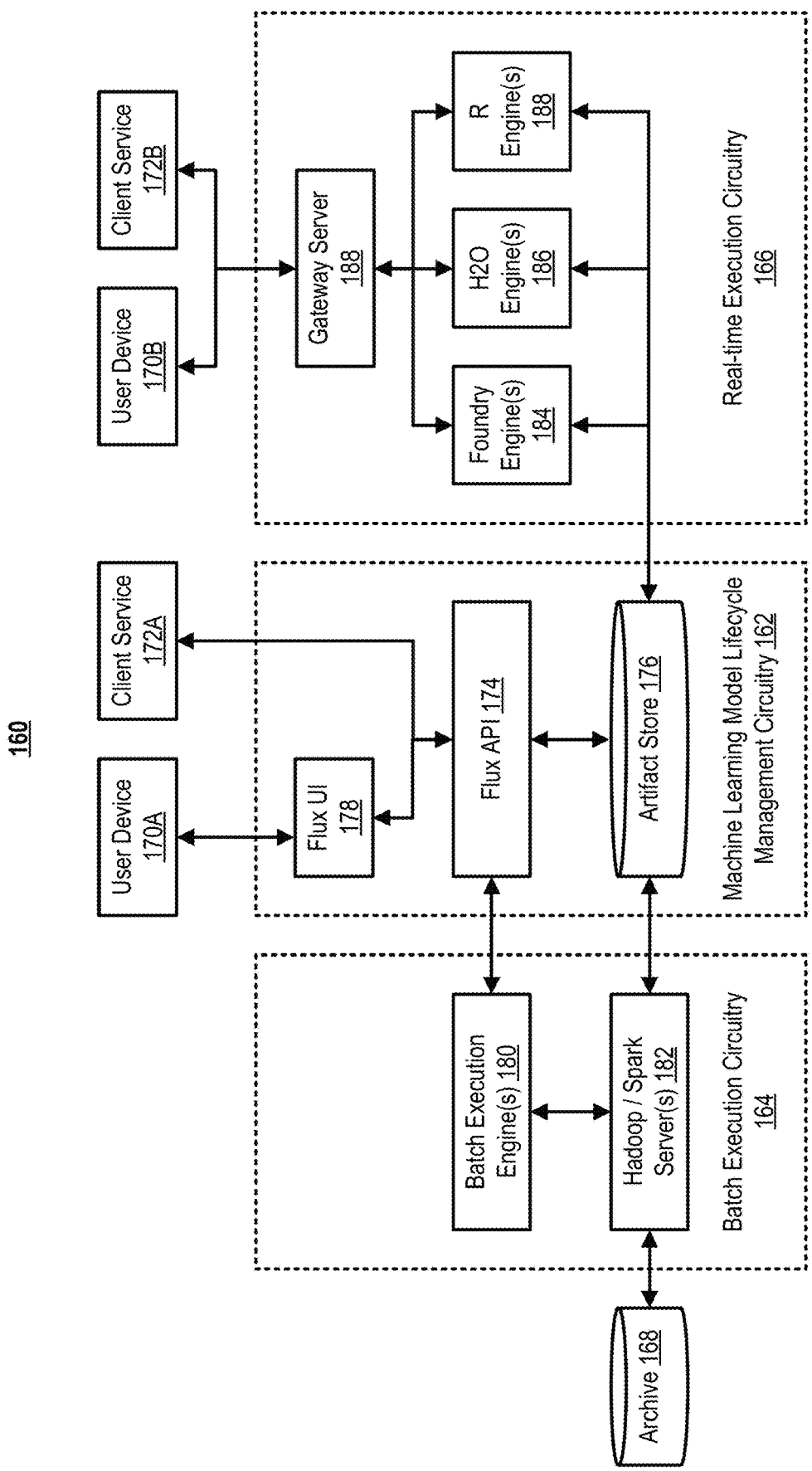
FIG. 1D illustrates an example architecture diagram of a system in accordance with some example embodiments.

FIG. 1D illustrates an example system architecture of an example environment 160 comprising machine learning model lifecycle management circuitry 162, batch execution circuitry 164, real-time execution circuitry 166, archive 168, user device 170A, user device 170B (which may be the same as, or different from, user device 170A), client service 172A (e.g., a client device executing a client service), and client service 172B (which may be the same as, or different from, client service 172A). In some embodiments, the machine learning model lifecycle management system disclosed herein (e.g., machine learning model lifecycle management system 102) may comprise machine learning model lifecycle management circuitry 162, batch execution circuitry 164, real-time execution circuitry 166. In some embodiments, the machine learning model lifecycle management system disclosed herein may further comprise, or be in communication with, archive 168. Archive 168 and artifact store 176 may be embodied as any suitable memory, database, database server, or combination thereof.

In some embodiments, machine learning model lifecycle management circuitry 162 may comprise Flux API 174 and artifact store 176. In some embodiments, machine learning model lifecycle management circuitry 162 may further comprise Flux UI 178 communicatively coupled with user device 170A and Flux API 174, whereas the client service 172A may be communicatively coupled directly with Flux API 174. In some embodiments, batch execution circuitry 164 may comprise one or more batch execution engines 180 and one or more Hadoop/Spark servers 182. In some embodiments, real-time execution circuitry 166 may comprise one or more Foundry execution engines 184, one or more H2O execution engines 186, one or more R execution engines 188, and a gateway server 188 communicatively coupled with user device 170B, client service 172B, or both. In some embodiments, clients (e.g., user device 170A, client service 172A) may make requests to the machine learning model lifecycle management circuitry 162 through the Flux API 174. Depending on the use case, models may be executed by either the batch execution circuitry 164 or the real-time execution circuitry 166.

In some embodiments, the machine learning model lifecycle management circuitry 162 may provide for automatic hyper-parameter tuning, where clients may define a set of hyper-parameter ranges for the specific model algorithm. The machine learning model lifecycle management circuitry 162 may explore (e.g., analyze) the parameter space and pick (e.g., select) the set of hyper-parameters that yields optimal model performance. In some embodiments, the machine learning model lifecycle management circuitry 162 may provide for automated model selection where multiple candidate implemented with different algorithms are trained with the same training data, and run alongside with the incumbent model. The machine learning model lifecycle management circuitry 162 may monitor the performance of all candidates, and promote a candidate once it out-performs the incumbent model. Accordingly, the machine learning model lifecycle management circuitry 162 may pick the algorithm that has optimal performance.

In some embodiments, the real-time execution circuitry 166 may containerize the microservice created for each model, where a container is spun up when requested or when training finishes. In some embodiments, the real-time execution circuitry 166 may utilize Docker for easy provisioning of real-time scoring services, where a container is spun up within an environment such as an Apache Mesos cluster when requested or when training finishes. This way the microservices are even more light-weight, and the overhead of box provisioning and model deployment is significantly reduced.

Accordingly, the machine learning model lifecycle management system described herein (e.g., machine learning model lifecycle management system 102) is configured to manage the lifecycles of machine learning models and their execution, and to function as the interface positioned between two sets of users (e.g., a data science team and an engineering team). The machine learning model lifecycle management system provides functionalities to create Models and Experiments, execute models in both batch and real-time mode, and archive the predictions for AB testing and analytical purposes. In some instances, the design of the machine learning model lifecycle management system balances highly optimized, fast code with easy management. In one example, data scientist teams may use the machine learning model lifecycle management system via a user-friendly Flux UI (e.g., Flux UI 128, Flux UI 178). In another example, engineering teams may directly invoke the REST APIs (e.g., Flux API 124, Flux API 174) programmatically.

As described above, in some embodiments, the machine learning model lifecycle management system may comprise three components: a central lifecycle management component (e.g., machine learning model lifecycle management circuitry 162, machine learning model lifecycle management circuitry 212); a batch execution engine (e.g., batch execution circuitry 164, batch execution circuitry 214) that, in some instances, runs on Hadoop YARN; and a real-time execution engine (e.g., real-time execution circuitry 166, real-time execution circuitry 216) that, in some instances, enables utilizing models as a microservice.

In some embodiments, the lifecycle management component is configured to handle incoming requests from clients to manage model lifecycle over REST APIs and orchestrate model execution. The lifecycle management component is configured to store data about Models, Experiments, and Runs in a database. The lifecycle management component is configured to launch model execution using the proper Execution Engines. The lifecycle management component is further configured to persist information on the status of the model execution and to make that information available via REST API. In some embodiments, the lifecycle management component is the core of the machine learning model lifecycle management system and may be only loosely coupled with other components, such as the execution components. In some instances, new Execution Engines may be implemented and plugged into the system. In some embodiments, the execution components may scale horizontally by adding more resources: more nodes for batch execution; and more hosts for real-time execution.

In some embodiments, the batch execution component is configured to submit model execution to a Hadoop YARN cluster and parallelize the computation to achieve high-throughput.

In some embodiments, the real-time execution component is configured to expose a trained machine learning model as a RESTful microservice to provide predictions for incoming requests. The real-time execution component is configured to serve as the execution engine for models that need on-demand, real-time scoring.

In some embodiments, the machine learning model lifecycle management system provides a core library that encapsulates many runtime functionalities of the platform, which may be embedded in other architectures. In some embodiments, clients may choose to use the machine learning model lifecycle management system as a service, or integrate the runtime library into their own systems.

As a foundation for some embodiments, the machine learning model lifecycle management system may be discussed with reference to an example system architecture comprising models, experiments, runs, run types, artifacts, model engines, execution engines, and input data.

A "Model" is an abstraction over specific machine learning tasks. A Model defines the target variable (e.g., what to predict). For example, a lead scoring model predicts the score of potential partners, and a customer lifetime value model predicts the value of each customer to a company. A model may serve as an organizational tool to different iterations of machine learning models that attempt to address the same or substantially similar problem. A model may have other attributes such as the name of the field that uniquely identifies each feature vector (e.g., identifier).

Each Model may have a number of Experiments. An "Experiment" defines the concrete plan of how to predict the target variable, including the specific machine learning algorithm, the actual implementation of the algorithm, and a set of hyper-parameters. Each Model may also have exactly one Published Experiment, which serves as the default Experiment for a given Model until a new Experiment is published. In this way a first set of users (e.g., an engineering team) may be locked in with a certain Experiment and its defined schema of the feature vector, while a second set of users (e.g., a data science team) may vary the Experiments separately without affecting the production environment.

For each Experiment, the client may trigger multiple Runs. A "Run" specifies an input dataset and has a certain Type, such as Training, Batch Scoring, Scoring, and Real-time Scoring. Training Runs generate new model artifacts using a training set. Batch Scoring Runs produce predictions offline over a large batch of inputs. Scoring Runs produce predictions given a scoring set. Real-time Scoring Runs provision a microservice that hosts the model for online prediction requests.

A model "Artifact" is the product of a training process that may be executed on a scoring dataset to provide scores. A model Artifact may include serialized trained models (e.g., predictors) and associated side data such as the location of the Artifact within the artifact store.

A "Model Engine" is the machine learning library that provides implementation of various algorithms, usually associated with certain programming languages. The machine learning model lifecycle management system supports at least three Model Engines: R; Cognitive Foundry, a Java library; and H2O. New Model Engines may be integrated easily by implementing a set of interfaces.

The machine learning model lifecycle management system 102 may comprise one or more Execution Engines. In some embodiments, the combination of Run Types and Model Engines produce the Execution Engines, which will invoke the training or scoring with a given set of model parameters on specific technology stack, as shown in Table B:

TABLE B

| | Model Type | | |
| --- | --- | --- | --- |
| Run Type | R | Foundry | H2O |
| Batch Scoring | R on PySpark | Spark | Spark |
| Real-time Scoring | Real-time R | Real-time Foundry | Real-time H2O |
| Training | R on PySpark, or Single R process | Foundry Training, or Single Java process | H2O Training |

Depending on the execution engine, the machine learning model lifecycle management system takes input data of different formats. For batch scoring and training, the machine learning model lifecycle management system may take a path on HDFS where the input dataset is located. The dataset may have various formats such as JSON, CSV, and TSV. In some instances, the machine learning model lifecycle management system does not specify how the input data is generated, so the clients may use any tool to create the dataset. For example, some clients may use an ETL management system, such as QED, to generate a scoring dataset. For real-time scoring, the machine learning model lifecycle management system may take an HTTP payload in JSON.

In some embodiments, the machine learning model lifecycle management system may provide a set of functionalities for the management of model lifecycle. In some embodiments, clients may create and delete Models, create new Experiments for Models, and create new Runs for an Experiment or for a Model where an Experiment is published. When creating a Model, the clients may provide a title and a description and one or more target variables that this model will predict. In addition, the clients may specify an identifier field that uniquely identifies each feature vector (e.g., row) that will be scored. Unique identifiers are especially useful for optimizing storage of model outputs for analytics.

In some embodiments, when creating an Experiment of a Model, clients may specify model parameters that include relevant data to make a Run of specified execution engine. For example, for R on PySpark execution engine, model parameters may include an R script that will be sourced to produce the scores, an RData binary file that contains the serialized model object that will be loaded prior to the scoring, and any additional side data in the form of RData files. For the Foundry execution engine, model parameters may contain the type of the model, random forest or logistic regression, and a set of hyper-parameters specific to the model, such as the number of trees and maximum depth of each tree in a random forest, or the strength of L1 and L2 regularization for logistic regression. Hyper-tuning may be implemented for these models.

In one illustrative example, for a given Model, clients may publish an existing Experiment, making it the default Experiment for this Model. This key feature allows the engineering team to "lock in" with one published Experiment and its associated feature vector schema, thus guaranteeing a stable production environment and eliminating the necessity of modifying downstream clients of the Model for every small change in the Model. At the same time, data science teams may independently create new Experiments with different settings, and are thus able to iterate fast on newer versions of the Model. Once the data scientists are satisfied with the newer iteration and has communicated changes to the scoring process to the engineering team, either side can go ahead and publish the new Experiment, completing a lifecycle of one particular model implementation.

In some embodiments, when creating a Run, clients may specify the input data location. The machine learning model lifecycle management system may read input data from one or more HDFS clusters, and may take input in multiple formats including line-delimited JSON, CSV, TSV, and other suitable formats. Request to create a new batch-scoring or training Run for a Model may receive a response containing the Run ID. Clients may then check the status of the Run using the ID. For real-time scoring, the prediction is instantly provided as the response for the scoring request, and no status checking is needed.

In some embodiments, for an Experiment, Training Runs may produce trained Artifacts that store fitted model parameters and may be executed on a scoring dataset during scoring Runs to produce predictions. Artifacts may be stored at an artifact store, indexed by the corresponding Run ID. Their locations may be preserved in the database and may be retrieved later for inspection. At the time of new Experiment creation, Artifacts may be uploaded from the clients via the REST API. This feature may enable the data scientists to train a model offline and upload it to the machine learning model lifecycle management system once it is ready for production. In some embodiments, at any moment, clients may use an API (e.g., Flux API) to look up the details of any Model, Experiment, and Run, and check the output predictions.

Various embodiments of the batch execution engine (e.g., batch execution circuitry 164, batch execution circuitry 214) and the real-time execution engine (e.g., real-time execution circuitry 166, real-time execution circuitry 216) are described in further detail below.

With reference to the batch execution engine, in some embodiments, the machine learning model lifecycle management system may comprise several execution engines that operate in batch mode, R on PySpark scoring/training, and batch-scoring for Foundry and H2O. In some embodiments, the machine learning model lifecycle management system may utilize Apache Spark for batch execution, and scaling-up may be done by requesting more executors and more resources per executor. A Run that is executed by these engines may comprise multiple steps referred to as jobs. The machine learning model lifecycle management system may use a simple sequential workflow to manage the execution of these jobs. Job types include Data Fetch, Execution, Monitor, and Archiving.

In some embodiments, when a request to create a Run is received, the machine learning model lifecycle management system may take the model engine of the Experiment and Run type, and determine which execution engine to use. The machine learning model lifecycle management system then may fetch a predefined workflow template for the execution engine, and create entries in its job queue. Each Flux Worker box (e.g., one or more Flux workers 152) will read the job queue and take one job at a time. Once an upstream job is successfully finished, the next job will be picked up. Otherwise, the failed job will be retried till a maximum number of failures is reached, at which point the entire Run will fail and clients will be notified.

In one illustrative example embodiment, a workflow may have the following job types: Data Fetch, Execution, Monitor, and Archive:

Data Fetch. A Data Fetch Job is the first step in a workflow. It simply reads the input data information of the Run and passes it to the next job.

Execution. The actual execution happens within the Execution Job. The machine learning model lifecycle management system may take the model engine of the Experiment and Run Type and decide which Execution Engine to use. For scoring Runs, the machine learning model lifecycle management system executes the artifact on the input data using the model Artifact and produces a scored dataset. For training Runs, the machine learning model lifecycle management system creates new model Artifacts and, in some instances, uploads those new model Artifacts to the artifact store and updates the Experiment accordingly.

Monitor. Continues to poll the status of the execution to check whether it is finished (e.g., until it finishes), and whether it was successful. In some instances, Monitor may update the Run status.

Data Save (e.g., Archive). Archives predictions to HDFS and Teradata for later use, typically for AB testing and offline analytics. If the execution is successful, the machine learning model lifecycle management system saves the output to different sinks. The machine learning model lifecycle management system may archive predictions to both HDFS and Teradata. Each Model may have its own table in both datastores, and rows may be indexed by Run ID and Experiment ID. Predictions may be indexed by Model ID, Experiment ID, and Run ID, so data scientists and analysts can exactly tell what algorithms and parameters lead to the scores. For Training Runs, the machine learning model lifecycle management system may save trained model Artifacts to the artifact store to be used by scoring Runs later.

In some embodiments, the machine learning model lifecycle management system comprises a batch execution engine interface. In one example, for Foundry models, the machine learning model lifecycle management system may wrap around the underlying model objects with a Scorer interface, which has a score function that takes a payload and returns a prediction. In another example, for R models, the machine learning model lifecycle management system may launch a PySpark job on the Hadoop/Spark cluster (e.g., Hadoop/Spark server 182). The Python process passes the input data to the R runtime via a library that allows Python/R interoperation. The R runtime then parses the data into a dataframe and then invokes a score function from an R library provided by the machine learning model lifecycle management system. The Python process then reads the serialized result from R and passes it back to Spark JVM.

One big challenge in the design process of the machine learning model lifecycle management system is how to ensure a uniform interface for different Execution Engines. The Model Engines that the machine learning model lifecycle management system supports may be implemented with multiple programming languages such as Java and R. Some of them may have clearly defined APIs, making them easier to integrate, while others may need more careful design. For Foundry and H2O models, the machine learning model lifecycle management system may wrap around the underlying model objects with an interface that takes a payload and returns a prediction. For R models, the machine learning model lifecycle management system may comprise an adapter that runs arbitrary R scripts parallelly in a Spark cluster. Within only a few constraints imposed by the machine learning model lifecycle management system, an R script may be executed in the same way that a data scientist does locally in RStudio, but for all the data partitions simultaneously. When a scoring Run starts, the machine learning model lifecycle management system may launch a PySpark job on the Spark cluster. For each partition, the Python process may pass the input data to the R runtime via a library that enables Python/R interoperation. The R runtime then may parse the data into a dataframe, invoke a score function from an R library provided by the machine learning model lifecycle management system, and pass the score back to the Python process. Subsequently, the PySpark job may write all the scored partitions into HDFS. The machine learning model lifecycle management system may use heuristics to optimize Spark parameters such as number of partitions, and neither data scientists nor downstream clients of models on the machine learning model lifecycle management system need to be aware of those details.

In some embodiments, the real-time execution engine may be configured to provide clients with fast, on-demand scoring of a feature vector using a machine learning model. Flux Real-Time Scoring (RTS) is a component of the machine learning model lifecycle management system that encapsulates a trained model behind a RESTful service. In some instances, RTS is a component of the machine learning model lifecycle management system that provides a RESTful service, which utilizes a trained model to provide scores or predictions for incoming requests. Flux RTS serves as the real-time execution engine for models on the machine learning model lifecycle management system. A single model Artifact may be hosted inside a web application, and used as a function to produce scores. Essentially, the machine learning model lifecycle management system, in some instances, may be configured to expose a machine learning model in a service-oriented manner to be used by other systems. In certain instances, running a model as a microservice may the most straightforward way to ensure that no unnecessary overhead costs are paid.

In some embodiments, the Flux RTS service may distributed among multiple hosts, behind a Gateway server (e.g., gateway server 188) that acts as both proxy and router. The Gateway server stores information on what Experiment ID is associated with which hosts, and upon receiving a client request to a given Experiment ID, the Gateway server routes the payload to the corresponding hosts. In some instances, upon receiving response from the host, the Gateway server may simply proxy it back to the client.

In some embodiments, Foundry and H2O workers may be responsible for scoring requests for models implemented with Foundry and H2O, respectively. In some embodiments where both the web application and the model are implemented in Java, the web application may simply use the model as an in-memory Java object to score. After the prediction is made, Foundry and H2O workers may transmit the response back to the Gateway server.

In some embodiments, for models implemented with R, the web application may not directly use the model object as an in-memory function, and instead use inter-process communication. Flux RTS may use a library that allows JVM and R processes to communicate via a web socket. Upon receiving the payload for a scoring request, the web application may transmit the data to R via the socket, and invoke the score function from the Flux R library. Once a prediction is made, the web application may fetch the serialized result from R and transmit it back to the Gateway server.

In some embodiments, the Model may be trained via Training Runs, and deployed to Flux RTS hosts upon client request, in a manner similar to publishing an Experiment. Upon model deployment, Flux RTS will consult Flux REST APIs to get the current Artifact ID for the given Models, and load the artifact from the artifact store into memory. Even though the model itself may be viewed as a fast function, the cost of loading and unloading a model instance is sometimes not negligible, so, in some instances, model loading is done only once during deployment.

In some embodiments, the machine learning model lifecycle management system 102 may provide for receiving a machine learning model selection, a machine learning model experiment creation input (e.g., a machine learning model experiment name, a machine learning model experiment description, a machine learning model execution engine selection, at least one machine learning model scoring file, and at least one machine learning model scoring data file), a machine learning model experiment run type (e.g., one of batch scoring, real-time scoring, or training), and a machine learning model input data path. The machine learning model lifecycle management system 102 may receive this data from various sources, including but not necessarily limited to the one or more user devices 110A-110N, the one or more programmatic client devices 112A-112N, the one or more remote server devices 114, the one or more remote data storage devices 116, or a combination thereof. In some embodiments, the machine learning model lifecycle management system 102 may provide for determining a machine learning model execution engine based on the machine learning model execution engine selection and the machine learning model experiment run type. In some embodiments, the machine learning model lifecycle management system 102 may provide for retrieving input data based on the machine learning model input data path. The machine learning model lifecycle management system 102 may retrieve the input data from various sources, including but not necessarily limited to the one or more remote server devices 114, the one or more remote data storage devices 116, or a combination thereof. In some embodiments, the machine learning model lifecycle management system 102 may provide for executing a machine learning model experiment based on the machine learning model execution engine, the machine learning model scoring file, the at least one machine learning model scoring data file, and the input data. In some embodiments, the machine learning model lifecycle management system 102 may provide for generating, based on the machine learning model experiment, one or more machine learning model scores associated with the machine learning model experiment and the input data. In some embodiments, the machine learning model lifecycle management system 102 may provide for publishing the one or more machine learning model scores.

Example Implementing Apparatus

Figure 2:
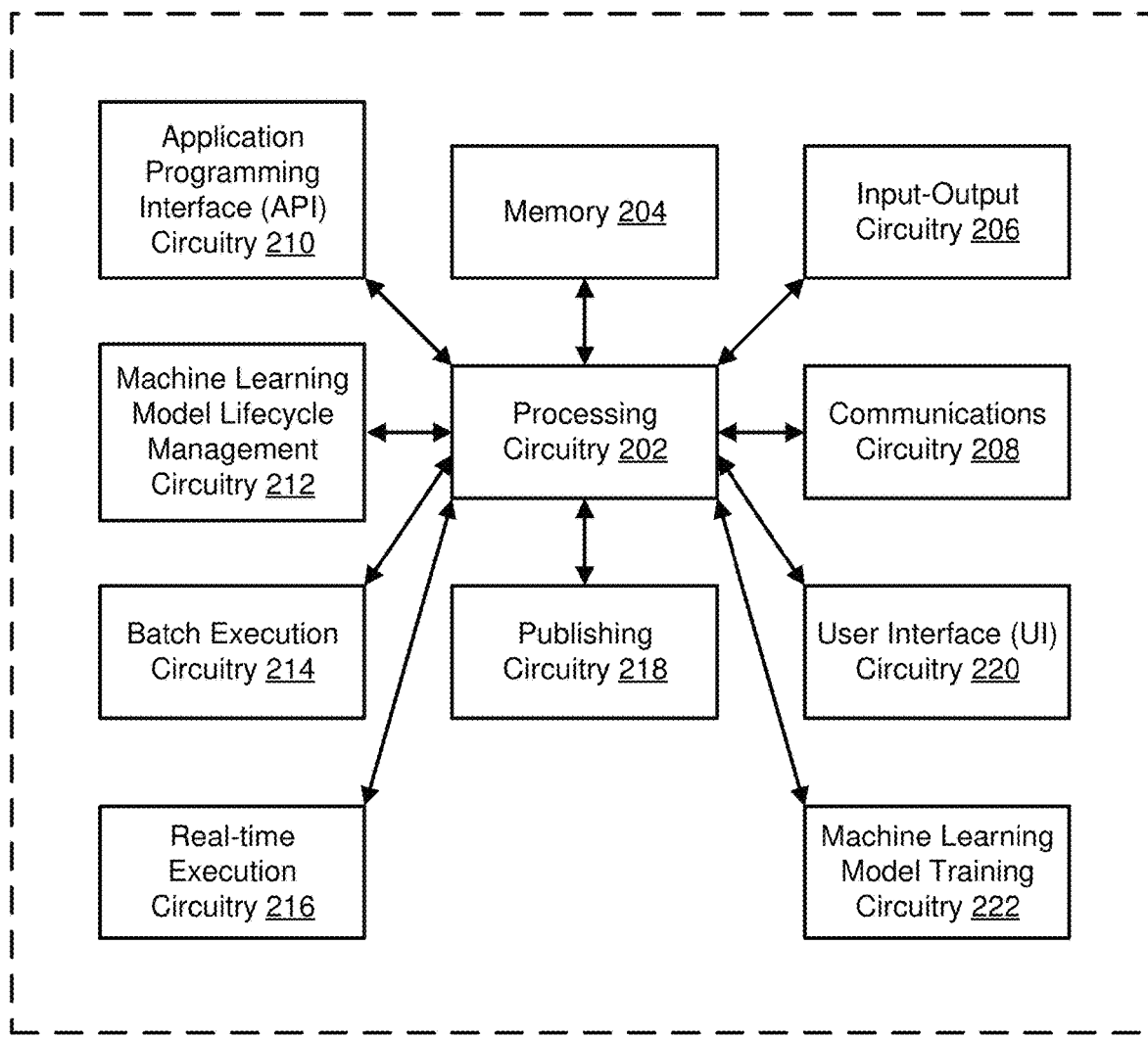
FIG. 2 illustrates an example schematic block diagram in accordance with some example embodiments.

The machine learning model lifecycle management system 102 described with reference to FIG. 1 may be embodied by one or more computing apparatuses, such as apparatus 200 shown in FIG. 2. As illustrated in FIG. 2, the apparatus 200 may include processing circuitry 202, memory 204, input-output circuitry 206, communications circuitry 208, application programming interface (API) circuitry 210, machine learning model lifecycle management circuitry 212, batch execution circuitry 214, real-time execution circuitry 216, publishing circuitry 218, user interface (UI) circuitry 220, and machine learning model training circuitry 222. The apparatus 200 may be configured to execute the operations described above with respect to FIG. 1 and below with respect to FIGS. 3-21. Although some of these components 202-222 are described with respect to their functional capabilities, it should be understood that the particular implementations necessarily include the use of particular hardware to implement such functional capabilities. It should also be understood that certain of these components 202-222 may include similar or common hardware. For example, two sets of circuitry may both leverage use of the same processor, network interface, storage medium, or the like to perform their associated functions, such that duplicate hardware is not required for each set of circuitry.

The use of the term "circuitry" as used herein with respect to components of the apparatus 200 therefore includes particular hardware configured to perform the functions associated with respective circuitry described herein. Of course, while the term "circuitry" should be understood broadly to include hardware, in some embodiments, circuitry may also include software for configuring the hardware. For example, in some embodiments, "circuitry" may include processing circuitry, storage media, network interfaces, input-output devices, and other components. In some embodiments, other elements of the apparatus 200 may provide or supplement the functionality of particular circuitry. For example, the processing circuitry 202 may provide processing functionality, memory 204 may provide storage functionality, and communications circuitry 208 may provide network interface functionality, among other features.

In some embodiments, the processing circuitry 202 (and/or co-processor or any other processing circuitry assisting or otherwise associated with the processor) may be in communication with the memory 204 via a bus for passing information among components of the apparatus. The memory 204 may be non-transitory and may include, for example, one or more volatile and/or non-volatile memories. For example, the memory 204 may be an electronic storage device (e.g., a computer-readable storage medium). In another example, the memory 204 may be a non-transitory computer-readable storage medium storing computer-executable program code instructions that, when executed by a computing system, cause the computing system to perform the various operations described herein. The memory 204 may be configured to store information, data, content, applications, instructions (e.g., computer-executable program code instructions), or the like, for enabling the apparatus 200 to carry out various functions in accordance with example embodiments of the present disclosure. For example, the memory 204 may be configured to store: machine learning model selections; machine learning model experiment creation input (e.g., comprising, but not limited to, machine learning model experiment names, machine learning model experiment descriptions, machine learning model execution engine selections, machine learning model scoring files, and machine learning model scoring data files); machine learning model experiment run types (e.g., batch scoring, real-time scoring, training); machine learning model input data paths; machine learning model scores; machine learning model statistics (e.g., comprising, but not limited to, feature identifiers, score timestamps, scores, and experiment identifiers); machine learning model experiment publishing selections; machine learning model training datasets (e.g., comprising, but not limited to, observations of target variables, and feature vectors comprising associated observations of non-target variables observed at times relative to the target variables); feature catalogs (e.g., comprising, but not limited to, feature definitions); UI data and content; machine learning model prediction data; any other suitable data or data structures; or any combination or combinations thereof. It will be understood that the memory 204 may be configured to store partially or wholly any electronic information, data, data structures, embodiments, examples, figures, processes, operations, techniques, algorithms, instructions, systems, apparatuses, methods, or computer program products described herein, or any combination thereof.

The processing circuitry 202 may be embodied in a number of different ways and may, for example, include one or more processing devices configured to perform independently. Additionally or alternatively, the processing circuitry 202 may include one or more processors configured in tandem via a bus to enable independent execution of instructions, pipelining, multithreading, or a combination thereof. The use of the term "processing circuitry" may be understood to include a single core processor, a multi-core processor, multiple processors internal to the apparatus, remote or "cloud" processors, or a combination thereof.

In an example embodiment, the processing circuitry 202 may be configured to execute instructions stored in the memory 204 or otherwise accessible to the processing circuitry 202. Alternatively or additionally, the processing circuitry 202 may be configured to execute hard-coded functionality. As such, whether configured by hardware or software methods, or by a combination of hardware with software, the processing circuitry 202 may represent an entity (e.g., physically embodied in circuitry) capable of performing operations according to an embodiment of the present disclosure while configured accordingly. As another example, when the processing circuitry 202 is embodied as an executor of program code instructions, the instructions may specifically configure the processor to perform the operations described herein when the instructions are executed.

In some embodiments, the apparatus 200 may include input-output circuitry 206 that may, in turn, be in communication with processing circuitry 202 to provide output to the user and, in some embodiments, to receive input such as a command provided by the user. The input-output circuitry 206 may comprise a user interface, such as a graphical user interface (GUI), and may include a display that may include a Flux UI, a web user interface, a GUI application, a mobile application, a client device, or any other suitable hardware or software. In some embodiments, the input-output circuitry 206 may also include a keyboard, a mouse, a joystick, a display device, a display screen, a touch screen, touch areas, soft keys, a microphone, a speaker, or other input-output mechanisms. The processing circuitry 202, input-output circuitry 206 (which may utilize the processing circuitry 202), or both may be configured to control one or more functions of one or more user interface elements through computer-executable program code instructions (e.g., software, firmware) stored in a non-transitory computer-readable storage medium (e.g., memory 204). Input-output circuitry 206 is optional and, in some embodiments, the apparatus 200 may not include input-output circuitry. For example, where the apparatus 200 does not interact directly with the user, the apparatus 200 may generate user interface data for display by one or more other devices with which one or more users directly interact and transmit the generated user interface data to one or more of those devices. For example, the apparatus 200, using UI circuitry 220, may generate UI data (e.g., Flux UI data) for display by one or more display devices and transmit the generated UI data to those display devices.

The communications circuitry 208 may be any device or circuitry embodied in either hardware or a combination of hardware and software that is configured to receive or transmit data from or to a network (e.g., one or more communications networks 108) or any other device, circuitry, or module in communication with the apparatus 200. In this regard, the communications circuitry 208 may include, for example, a network interface for enabling communications with a wired or wireless communication network. For example, the communications circuitry 208 may include one or more network interface cards, antennae, buses, switches, routers, modems, gateway servers, load balancers, and supporting hardware and/or software, or any other device suitable for enabling communications via a network. In some embodiments, the communications interface may include the circuitry for interacting with the antenna(s) to cause transmission of signals via the antenna(s) or to handle receipt of signals received via the antenna(s).

These signals may be transmitted or received by the apparatus 200 using any of a number of Internet, Ethernet, cellular, satellite, or wireless technologies, such as IEEE 802.11, Code Division Multiple Access (CDMA), Global System for Mobiles (GSM), Universal Mobile Telecommunications System (UMTS), Long-Term Evolution (LTE), Bluetooth® v1.0 through v5.0, Bluetooth Low Energy (BLE), infrared wireless (e.g., IrDA), ultra-wideband (UWB), induction wireless transmission, Wi-Fi, near field communications (NFC), Worldwide Interoperability for Microwave Access (WiMAX), radio frequency (RF), RFID, or any other suitable technologies.

The API circuitry 210 includes hardware components designed or configured to receive, process, generate, and transmit data, such as machine learning model selections, machine learning model experiment creation inputs, machine learning model experiment run types, and machine learning model input data paths. In some embodiments, the API circuitry 210 may be embodied as Flux API 124, Flux API Hosts 142, Flux API 174, or any other suitable device or circuitry.

In some embodiments, the API circuitry 210 may be in communication with a computing device (e.g., one or more user devices 110, one or more programmatic client devices 112, one or more remote server devices 114, one or more remote data storage devices 116, one or more client devices 122, Flux UI 128, one or more user devices 170, one or more client services 172, Flux UI 178, any other suitable computing device or circuitry, or a combination thereof) and thus configured to receive a machine learning model selection from the computing device.

In some embodiments, the API circuitry 210 may be further configured to receive a machine learning model experiment creation input from the computing device or from a different computing device. In some instances, the machine learning model experiment creation input may comprise a machine learning model experiment name, a machine learning model experiment description, a machine learning model execution engine selection, at least one machine learning model scoring file, and at least one machine learning model scoring data file.

In some instances, the at least one machine learning model scoring data file may comprise a trained machine learning model. The trained machine learning model is configured to be trained, or has been trained (e.g., by machine learning model training circuitry 222), using a machine learning model training dataset. The machine learning model training dataset may comprise a plurality of observations of a target variable and a feature vector comprising a plurality of associated observations of non-target variables observed at a time relative to the target variable.

In some embodiments, the API circuitry 210 may be further configured to receive a machine learning model experiment run type from the computing device or from a different computing device. In some instances, the machine learning model experiment run type is one of batch scoring, real-time scoring, or training. In some embodiments, the API circuitry 210 may be further configured to receive a machine learning model input data path from the computing device or from a different computing device.

In some embodiments, the API circuitry 210 may receive one or more of the machine learning model selection, the machine learning model experiment creation input, the machine learning model experiment run type, and the machine learning model input data path from a first computing device (e.g., a user device 110, a programmatic client device 112) and, in response, obtain the remainder of the machine learning model selection, the machine learning model experiment creation input, the machine learning model experiment run type, and the machine learning model input data path from a second computing device (e.g., a remote data storage device 116). In some embodiments, the API circuitry 210 may receive the machine learning model selection, the machine learning model experiment creation input, the machine learning model experiment run type, and the machine learning model input data path from the memory 204.

In some embodiments, the API circuitry 210 may be in communication with and configured to transmit data (e.g., one or more of the machine learning model selection, the machine learning model experiment creation input, the machine learning model experiment run type, and the machine learning model input data path) to one or more computing devices or circuitries, such as DaaS 126, one or more remote devices 130 (e.g., Gdoop Spark server 132), Gdoop resource manager 146, one or more Flux Utility Hosts 148 (e.g., scheduler 150, one or more Flux workers 152, job monitor 154), batch execution circuitry 164 (e.g., one or more batch execution engines 180), artifact store 176, or any other suitable device or circuitry.

The machine learning model lifecycle management circuitry 212 includes hardware components designed or configured to receive, process, generate, and transmit data, such as machine learning model experiments and machine learning model scores. In some embodiments, the machine learning model lifecycle management circuitry 212 may be embodied as machine learning model lifecycle management circuitry 162 or any other suitable device or circuitry.

In some embodiments, machine learning model lifecycle management circuitry 212 may be in communication with the API circuitry 210 and thus configured to receive the machine learning model selection, the machine learning model experiment creation input, the machine learning model experiment run type, the machine learning model input data path, or a combination thereof from the API circuitry 210. In some embodiments, the machine learning model lifecycle management circuitry 212 may be configured to determine a machine learning model execution engine based on the machine learning model execution engine selection and the machine learning model experiment run type. For example, the machine learning model lifecycle management circuitry 212 may be configured to determine a machine learning model execution engine in accordance with the techniques described above with reference to FIGS. 1A-1D.

In some embodiments, the machine learning model lifecycle management circuitry 212 may be configured to retrieve input data based on the machine learning model input data path. For example, the machine learning model lifecycle management circuitry 212 may be configured to retrieve the input data from a computing device (e.g., a data storage device or database), memory (e.g., memory 204), or both. In some instances, the input data may comprise a feature vector. The feature vector may comprise a most recent observation for each of a plurality of features. Each of the plurality of features may be identified by a feature identifier and associated with an observation timestamp.

In some embodiments, the machine learning model lifecycle management circuitry 212 may be configured to execute a machine learning model experiment based on the machine learning model execution engine, the machine learning model scoring file, the at least one machine learning model scoring data file, and the input data. For example, the machine learning model lifecycle management circuitry 212 may be configured to execute a machine learning model experiment by transmitting instructions and data to the batch execution circuitry 214 or the real-time execution circuitry 216.

In some embodiments, the machine learning model lifecycle management circuitry 212 may be configured to generate one or more machine learning model scores based on the machine learning model experiment. In some instances, the one or more machine learning model scores may be associated with the machine learning model experiment and the input data. In some embodiments, the one or more machine learning model scores may comprise one or more score statistics. In some instances, each score statistic of the one or more machine learning model scores may comprise a feature identifier, a score timestamp, a score, and an experiment identifier.

In some embodiments, the machine learning model lifecycle management circuitry 212 may be configured to: retrieve the input data stored in a memory location identified by the machine learning model input data path; load the at least one machine learning model scoring data file into a machine learning model execution environment based on the machine learning model execution engine selection; and execute the machine learning model scoring file to create a machine learning model data frame comprising the one or more machine learning model scores.

In some embodiments, wherein the machine learning model experiment run type is batch scoring, the machine learning model lifecycle management circuitry 212 may be further configured to: determine that the machine learning model execution engine is a batch execution engine; generate a batch execution control signal indicative of an electronic instruction to execute the machine learning model experiment based on the batch execution engine; transmit the batch execution control signal to batch execution circuitry 214, wherein batch execution circuitry 214 is configured to execute the machine learning model experiment based on the batch execution engine; receive batch execution data from the batch execution circuitry 214, wherein the batch execution data is indicative of one or more results (e.g., scores, predictions, statistics, or other data) of the machine learning model experiment executed by the batch execution circuitry 214 based on the batch execution engine; and generate the one or more machine learning model scores based on the batch execution data.

In some embodiments, wherein the machine learning model experiment run type is real-time scoring, the machine learning model lifecycle management circuitry 212 may be further configured to: determine that the machine learning model execution engine is a real-time execution engine; generate a real-time execution control signal indicative of an electronic instruction to execute the machine learning model experiment based on the real-time execution engine; transmit the real-time execution control signal to real-time execution circuitry 216, wherein real-time execution circuitry 216 is configured to execute the machine learning model experiment based on the real-time execution engine; receive real-time execution data from the real-time execution circuitry 216, wherein the real-time execution data is indicative of one or more results of the machine learning model experiment executed by the real-time execution circuitry 216 based on the real-time execution engine; and generate the one or more machine learning model scores based on the real-time execution data.

The batch execution circuitry 214 includes hardware components designed or configured to receive, process, generate, and transmit data, such as batch machine learning model experiments and batch machine learning model scores. In some embodiments, the batch execution circuitry 214 may be embodied as batch execution circuitry 164, as described above with reference to machine learning model lifecycle management circuitry 212, or as any other suitable device or circuitry.

The real-time execution circuitry 216 includes hardware components designed or configured to receive, process, generate, and transmit data, such as real-time machine learning model experiments and real-time machine learning model scores. In some embodiments, the real-time execution circuitry 216 may be embodied as real-time execution circuitry 166, as described above with reference to machine learning model lifecycle management circuitry 212, or as any other suitable device or circuitry.

The publishing circuitry 218 includes hardware components designed or configured to receive, process, generate, and transmit data, such as publishing selections, access data, and security credentials. In some embodiments, the publishing circuitry 218 may be configured to receive a machine learning model experiment publishing selection. In some instances, the machine learning model experiment publishing selection may comprise one or more access levels respectively associated with one or more users or sets of users. For example, the machine learning model experiment publishing selection may comprise a "read only" access level for a first set of users and a "read/write" access level for a second set of users.

In some embodiments, the publishing circuitry 218 may be further configured to enable access to the machine learning model experiment and the one or more machine learning model scores based on the machine learning model experiment publishing selection. In one illustrative example, the publishing circuitry 218 may be configured to permit a set of users to view the machine learning model experiment and the one or more machine learning model scores. In another illustrative example, the publishing circuitry 218 may be configured to lock in a first set of users (e.g., an engineering team) with the machine learning model experiment and its defined schema of the feature vector, while enabling a second set of users (e.g., a data science team) to vary the machine learning model experiment separately without affecting the production environment.

In some embodiments, the publishing circuitry 218 may be further configured to publish the machine learning model experiment and the one or more machine learning model statistics in a feature catalog. In some instances, the feature catalog may comprise a plurality of feature definitions.

The UI circuitry 220 includes hardware components designed or configured to receive, process, generate, and transmit data, such as UI data and content (e.g., Flux UI data and content). In some embodiments, the UI circuitry 220 may be embodied as Flux UI 128, Flux UI 178, or any other suitable device or circuitry.

In some embodiments, the UI circuitry 220 may be configured to generate UI data, such as the user interface display screens illustrated in FIGS. 7-21. In some embodiments, the UI circuitry 220 may be in communication with a display device (e.g., input-output circuitry 206, a user device 110, a user device 170, or a display device communicatively coupled thereto) and thus configured to transmit UI data (e.g., Flux UI display screen data) to the display device. For example, the UI circuitry 220 may be configured to generate UI data and transmit the generated UI data to the input-output circuitry 206, and the input-output circuitry 206 may be configured to receive the UI data and display the received UI data on one or more display screens.

The machine learning model training circuitry 222 includes hardware components designed or configured to receive, process, generate, and transmit data, such as trained machine learning models. In some embodiments, such as when the machine learning model experiment run type is training, the machine learning model training circuitry 222 may be configured to train the trained machine learning model using a machine learning model training dataset comprising a plurality of observations of a target variable and a feature vector comprising a plurality of associated observations of non-target variables observed at a time relative to the target variable.

In some embodiments, each of the API circuitry 210, machine learning model lifecycle management circuitry 212, batch execution circuitry 214, real-time execution circuitry 216, publishing circuitry 218, UI circuitry 220, and machine learning model training circuitry 222 may include a separate processor, specially configured field programmable gate array (FPGA), application specific interface circuit (ASIC), or cloud utility to perform the above functions. In some embodiments, the hardware components described above with reference to API circuitry 210, machine learning model lifecycle management circuitry 212, batch execution circuitry 214, real-time execution circuitry 216, publishing circuitry 218, UI circuitry 220, and machine learning model training circuitry 222, may, for instance, utilize communications circuitry 208 or any suitable wired or wireless communications path to communicate with a user device (e.g., one or more user devices 110, one or more user devices 170), a programmatic client device (e.g., one or more programmatic client devices 112), a client service (e.g., one or more client services 172), a server device (e.g., one or more remote server devices 114), a data storage device (e.g., one or more remote data storage devices 116), each other, or any other suitable circuitry or device.

In some embodiments, one or more of the API circuitry 210, machine learning model lifecycle management circuitry 212, batch execution circuitry 214, real-time execution circuitry 216, publishing circuitry 218, UI circuitry 220, and machine learning model training circuitry 222 may be hosted locally by the apparatus 200. In some embodiments, one or more of the API circuitry 210, machine learning model lifecycle management circuitry 212, batch execution circuitry 214, real-time execution circuitry 216, publishing circuitry 218, UI circuitry 220, and machine learning model training circuitry 222 may be hosted remotely (e.g., by one or more cloud servers) and thus need not physically reside on the apparatus 200. Thus, some or all of the functionality described herein may be provided by a third party circuitry. For example, the apparatus 200 may access one or more third party circuitries via any sort of networked connection that facilitates transmission of data and electronic information between the apparatus 200 and the third party circuitries. In turn, the apparatus 200 may be in remote communication with one or more of the API circuitry 210, machine learning model lifecycle management circuitry 212, batch execution circuitry 214, real-time execution circuitry 216, publishing circuitry 218, UI circuitry 220, and machine learning model training circuitry 222.

As described above and as will be appreciated based on this disclosure, embodiments of the present disclosure may be configured as systems, apparatuses, methods, computer program products, services (e.g., client services, machine learning model lifecycle management as-a-service), back-end network devices, other suitable devices, and combinations thereof. Accordingly, embodiments may comprise various means including entirely of hardware or any combination of software with hardware. Furthermore, embodiments may take the form of a computer program product on at least one non-transitory computer-readable storage medium having computer-readable program instructions (e.g., computer software) embodied in the storage medium. Any suitable computer-readable storage medium may be utilized including non-transitory hard disks, CD-ROMs, flash memory, optical storage devices, or magnetic storage devices. As will be appreciated, any computer program instructions and/or other type of code described herein may be loaded onto a computer, processor or other programmable apparatus's circuitry to produce a machine, such that the computer, processor, or other programmable circuitry that executes the code on the machine creates the means for implementing various functions, including those described herein.

The one or more user devices 110, user devices 170, programmatic client devices 112, client services 172, remote server devices 114, remote data storage devices 116, client devices 122, remote devices 130, and other devices and circuitries described with reference to FIGS. 1A-1D may be embodied by one or more computing devices or systems that also may include processing circuitry, memory, input-output circuitry, and communications circuitry. For example, a remote data storage devices 116 may be a database server on which computer code (e.g., C, C++, C#, java, a structured query language (SQL), a data query language (DQL), a data definition language (DDL), a data control language (DCL), a data manipulation language (DML)) is running or otherwise being executed by processing circuitry. In another example, a user device 110 may be a laptop computer on which an app (e.g., a GUI application provided by Flux UI 128) is running or otherwise being executed by processing circuitry. In yet another example, a user device 110 may be a smartphone on which an app (e.g., a webpage browsing app) is running or otherwise being executed by processing circuitry. As it relates to operations described in the present disclosure, the functioning of these devices may utilize components similar to the similarly named components described above with respect to FIG. 2. Additional description of the mechanics of these components is omitted for the sake of brevity. These device elements, operating together, provide the respective computing systems with the functionality necessary to facilitate the communication of data with the machine learning model lifecycle management system described herein.

Having described specific components of example devices involved in the present disclosure, example procedures for managing machine learning model lifecycles are described below in connection with FIGS. 3-21.

Figure 3A:
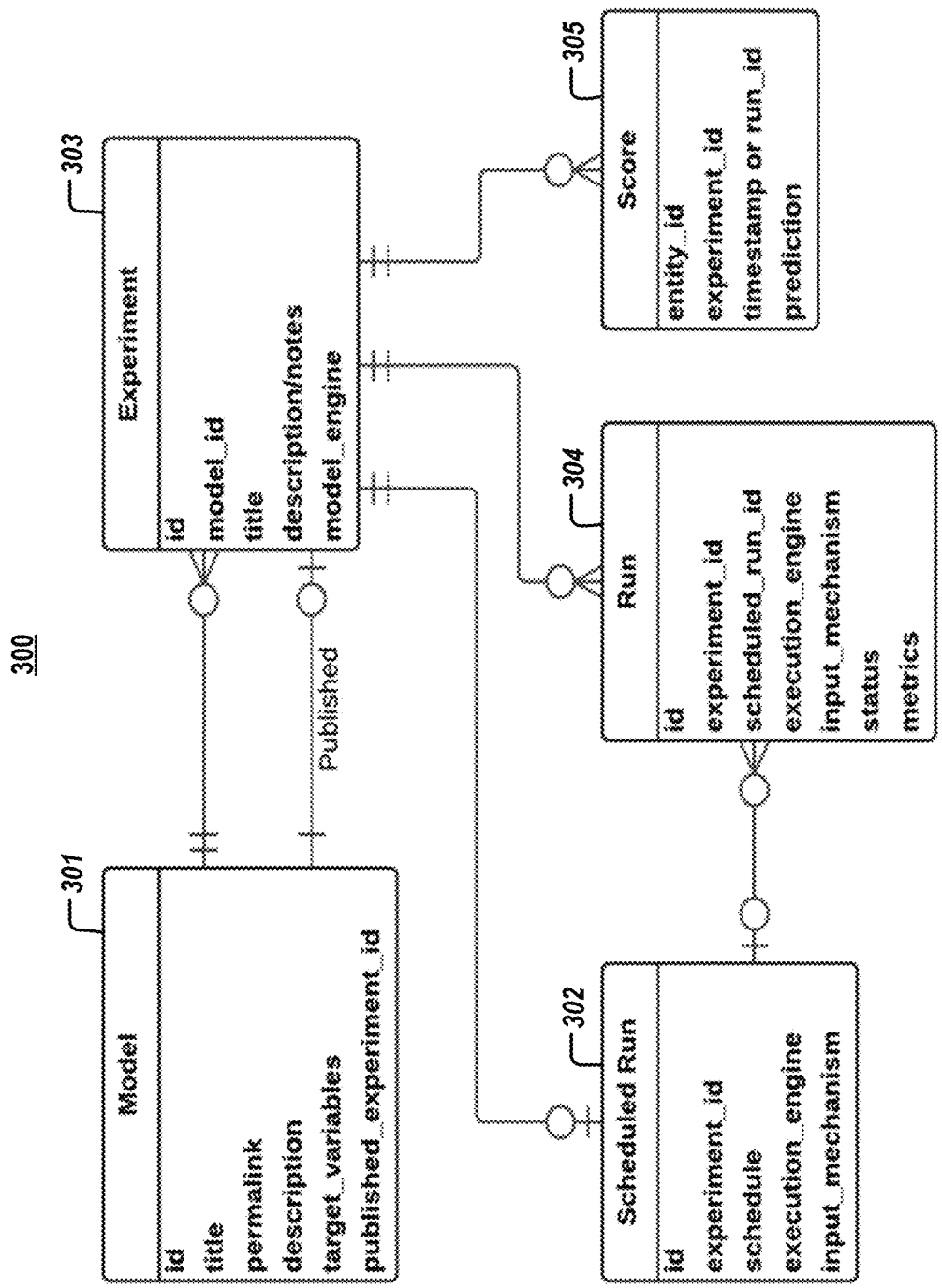
FIGS. 3A and 3B illustrate example machine learning model lifecycle management system architecture data models in accordance with some example embodiments.
Figure 3B:
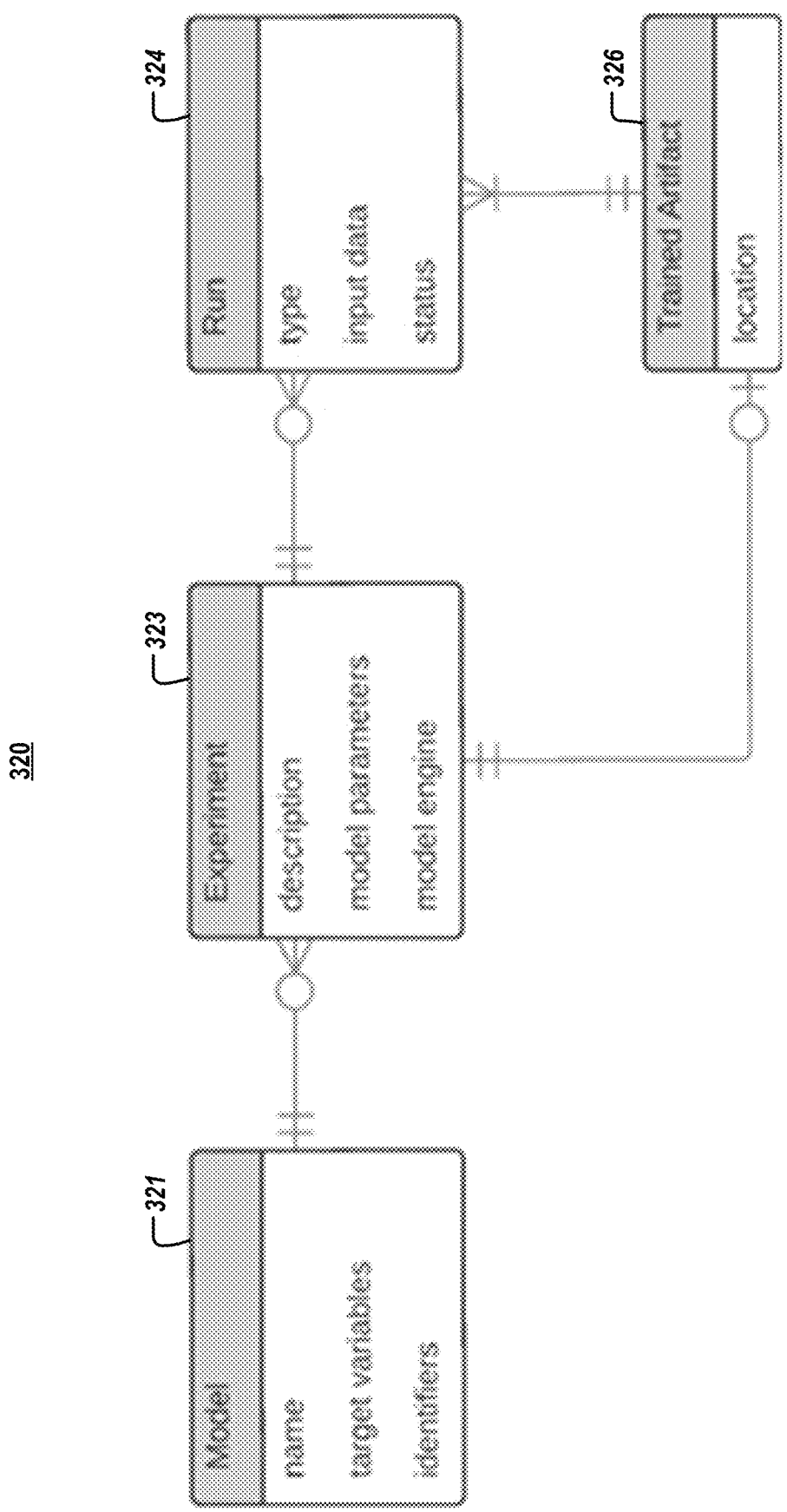

FIGS. 3A-3B illustrate examples of the machine learning model lifecycle management system's data model. FIG. 3A illustrates an example machine learning model lifecycle management system architecture data model 300 in accordance with some example embodiments. Blocks of data model 300 are the Model 301, the Scheduled Run 302, the Experiment 303, the Run 304, and the Score 305.

In some embodiments, a machine learning model 301 may represent the machine learning task. The machine learning model 301 may comprise a human friendly title (e.g., User Lifetime Value) and one or more target variables. In some embodiments, a machine learning model 301 record may comprise a machine learning model identifier, a title, a permalink, a description, target variables, and an identifier of a published experiment.

In some embodiments, a machine learning model experiment 303 may represent a method for predicting the target variables which comprise the machine learning model. The machine learning model experiment 303 may represent a certain set of features provided to a certain algorithm with a certain set of hyper-parameters. In some embodiments, a machine learning model experiment 303 record may comprise a machine learning model experiment identifier, a machine learning model identifier, a title, a description, and an indication of a machine learning model engine.

In some embodiments, a machine learning model experiment scheduled run 302 may represent a scheduled execution of a machine learning model experiment. Machine learning model scheduled runs come in multiple forms, including the training run, batch scoring runs, and always-on streaming runs. In some embodiments, a machine learning model experiment scheduled run 302 record may comprise a scheduled run identifier, an experiment identifier, a schedule, an indication of execution engine, and an input mechanism.

In some embodiments, a machine learning model experiment run 304 may represent the execution of a machine learning model experiment. Machine learning model runs come in multiple forms, including the training run, batch scoring runs, and always-on streaming runs. In some embodiments, a machine learning model experiment run 304 record may comprise a run identifier, an experiment identifier, an indication of execution engine, and an input mechanism. In some embodiments, the machine learning model experiment run 304 record may further comprise a status, metrics, and a scheduled run identifier.

In some embodiments, a machine learning model score 305 may represent a particular prediction of a target variable produced by the execution of a machine learning model experiment. In some embodiments, a machine learning model score 305 record may comprise an entity identifier, an experiment identifier, a score timestamp, and a score or, in some instances, a prediction.

FIG. 3B illustrates an example machine learning model lifecycle management system architecture data model 320 in accordance with some example embodiments. Blocks of data model 320 are the Model 321, the Experiment 323, the Run 324, and the Trained Artifact 326.

In some embodiments, a machine learning model 321 may represent the machine learning task. The machine learning model 321 may comprise a title, one or more target variables, and one or more identifiers. In some embodiments, a machine learning model 321 record may comprise a machine learning model identifier, a title, a permalink, a description, target variables, and an identifier of a published experiment.

In some embodiments, a machine learning model experiment 323 may represent a method for predicting the target variables which comprise the machine learning model. The machine learning model experiment 323 may represent a certain set of features provided to a certain algorithm with a certain set of hyper-parameters. In some embodiments, a machine learning model experiment 323 record may comprise a description, one or more model parameters, and an indication of a machine learning model engine.

In some embodiments, a machine learning model experiment run 324 may represent the execution of a machine learning model experiment. Machine learning model runs come in multiple forms, including the training run, batch scoring runs, and always-on streaming runs. In some embodiments, a machine learning model experiment run 324 record may comprise a run type, input data, and a status.

In some embodiments, a machine learning model trained artifact 326 may represent a particular trained artifact produced by the execution of a machine learning model experiment. In some embodiments, a machine learning model trained artifact 326 record may comprise a location.

In some embodiments, a machine learning model may have many machine learning model experiments over the course of its life, and may actively execute multiple machine learning model experiments simultaneously to compare performance. However, consumers of the machine learning model will not benefit from having a plurality of scores for the same record. Rather, a single machine learning model experiment is designated such that its scores are published or made accessible for consumption by downstream systems. While all scores are stored and made available to certain clients, a downstream consumer asking for the scores for a particular machine learning model will be given the scores for the currently published machine learning model experiment.

Figure 4:
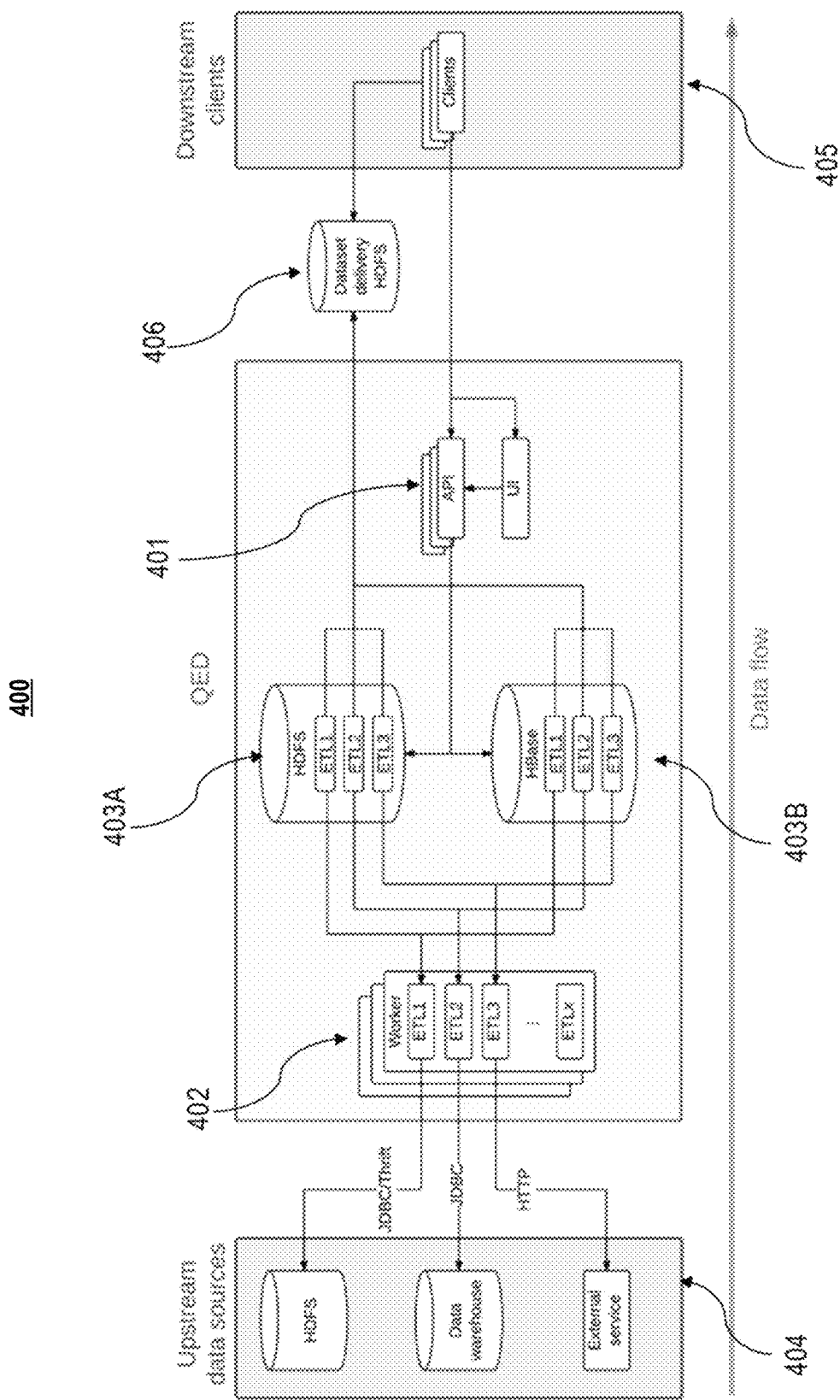
FIG. 4 illustrates an example architecture diagram of an example feature catalog system in accordance with some example embodiments.

FIG. 4 illustrates an example feature catalog system architecture in accordance with some example embodiments. In embodiments, a system architecture of a feature catalog system 400 (referred to herein and elsewhere as QED or Quantum Engineered Data) maintains a catalog of feature definitions and curating a data corpus where incoming data has been validated before being made available for use by models. Feature catalog system 400 includes an API and user interface 401, a worker component 402, and data stores 403 (e.g., HDFS data store 403A, HBase data store 403B). The workers 402 extract data from individual ETLs from upstream data sources 404 and persist them in data stores 403. Downstream clients 405 make requests through the API 401. The dataset is assembled and delivered via HDFS 406. Downstream clients 405 may explore the feature catalog through the user interface 401.

In some embodiments, the feature catalog system 400 may decouple the definition and generation of a feature from the definition and generation of a dataset. By modeling individual features first rather than datasets, QED shift the focus to the quality and correctness of individual feature calculations while simultaneously promoting reusability. To this end, the features defined in QED do not make any model-specific decisions, such as those surrounding imputation. Such decisions are "last-mile feature engineering," and such work belongs in the model engine.

In some embodiments, a feature defined in QED may comprise the details for how to calculate the feature as well as information about the cadence at which observations of the feature should be taken, and a set of validations to apply to new sets of observations to ensure data quality before incorporating the new measurements into the general corpus. Candidate observation sets that fail any of these validations are isolated and information about the data abnormality is sent to the appropriate parties for further investigation.

In some embodiments, there may be significant overlap between the features of a machine learning model that, for example, predicts bookings for a hypothetical distribution of device rendered objects for a merchant and a machine learning model that predicts bookings of an actual distribution of device rendered objects that is ready to launch. Similarly, in some embodiments, there may be significant overlap between the dataset used to predict a user's value over the next week and that used to predict a user's lifetime value. In QED such features may be designed and calculated once. When the distinct datasets are requested, they may be built from the common corpus of data.

In some embodiments, QED may define two types of dataset: the training dataset and the scoring dataset. In some instances, a machine learning model training dataset may be built from a set of observations of a target variable and corresponding feature vectors observed at some time relative to the target variable. In some instances, a machine learning model scoring dataset may be built from a set of feature vectors containing the most recent observation of each feature.

In some embodiments, there may be a temporal relationship between the target variable and the feature vector in a training dataset. That is, the values in the feature vector may have been observed some time X before the value of the target variable was observed. This might be a standard offset for all vectors, or it may be dynamic based on when the target variable was observed. For instance, if the target variable represents bookings for a deal 30 days after launch, then the feature vector may be observed as of the deal launch date, or, in some instances, 30 days before the deal launch to account for the sales cycle. If the target variable represents the current lifetime bookings of a user, the feature vectors may all be measured 90 days before today.

In some embodiments, to facilitate building these machine learning model training datasets, QED may maintain historical observations of feature values. In some embodiments, when generating a machine learning model scoring dataset, only the most recent observation may be used. However, when building a machine learning model training dataset, each feature vector may use the historical observations of the features to build the feature vector as it would have looked at some point relative to when the target variable was observed. Machine learning model scoring datasets may be much more straightforward. The requested feature vector may be returned with current observations.

Figure 5:
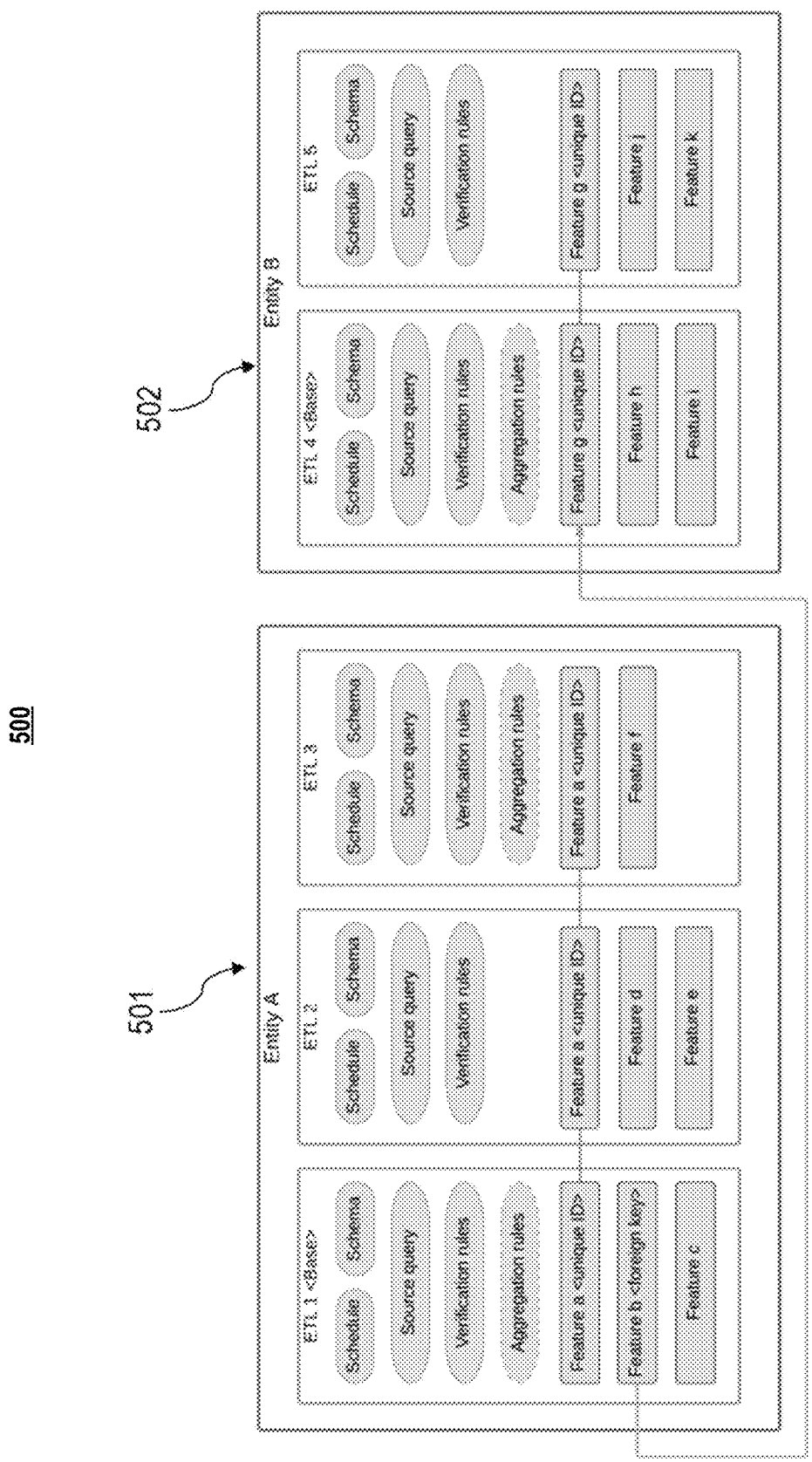
FIG. 5 illustrates an example data model of an example feature catalog system in accordance with some example embodiments.

FIG. 5 illustrates an example data model 500 of an example feature catalog system in accordance with some example embodiments. Features of each entity are grouped into ETLs, which are the basic unit of data extraction operations. Features within the same ETL are closely related and share the same data source and derivation logic (such as SQL queries or a request to external services). In some embodiments, each ETL may define the following metadata:

Schedule: the machine learning model execution run used by the scheduler;

Identifier: a unique identifier field of the entity of the ETL;

Source query: the source query if the data source is a database, otherwise a string stating the source. For time-dependent features, this is the scoring query for daily runs, and training query is defined in an additional list;

Schema: the data schema that specifies the datatype of each field, and whether the field may be null. The schema is versioned so that changes are tracked and verification does not fail when there is a schema change;

Verification rules: a list of statistical rules to be checked for each field; and Aggregation rules (optional): aggregations to be performed after data is extracted from upstream sources.

The data generated by each ETL may be stored independent in the respective data stores.

In some embodiments, the example data model 500 may depict two entities: Entity A 501; and Entity B 502. Entity A 501 comprises three ETLs, and Entity B 502 comprises two ETLs. Ellipses indicate metadata of the ETLs and dashed outlines indicates optional. Boxes indicate features. It will be appreciated that all ETLs of the same entity share the same unique identifier. In this example, Entity A 501 has declared that one of its features is a foreign key to Entity B 502.

Example Operations for Managing Machine Learning Model Lifecycles

Figure 6:
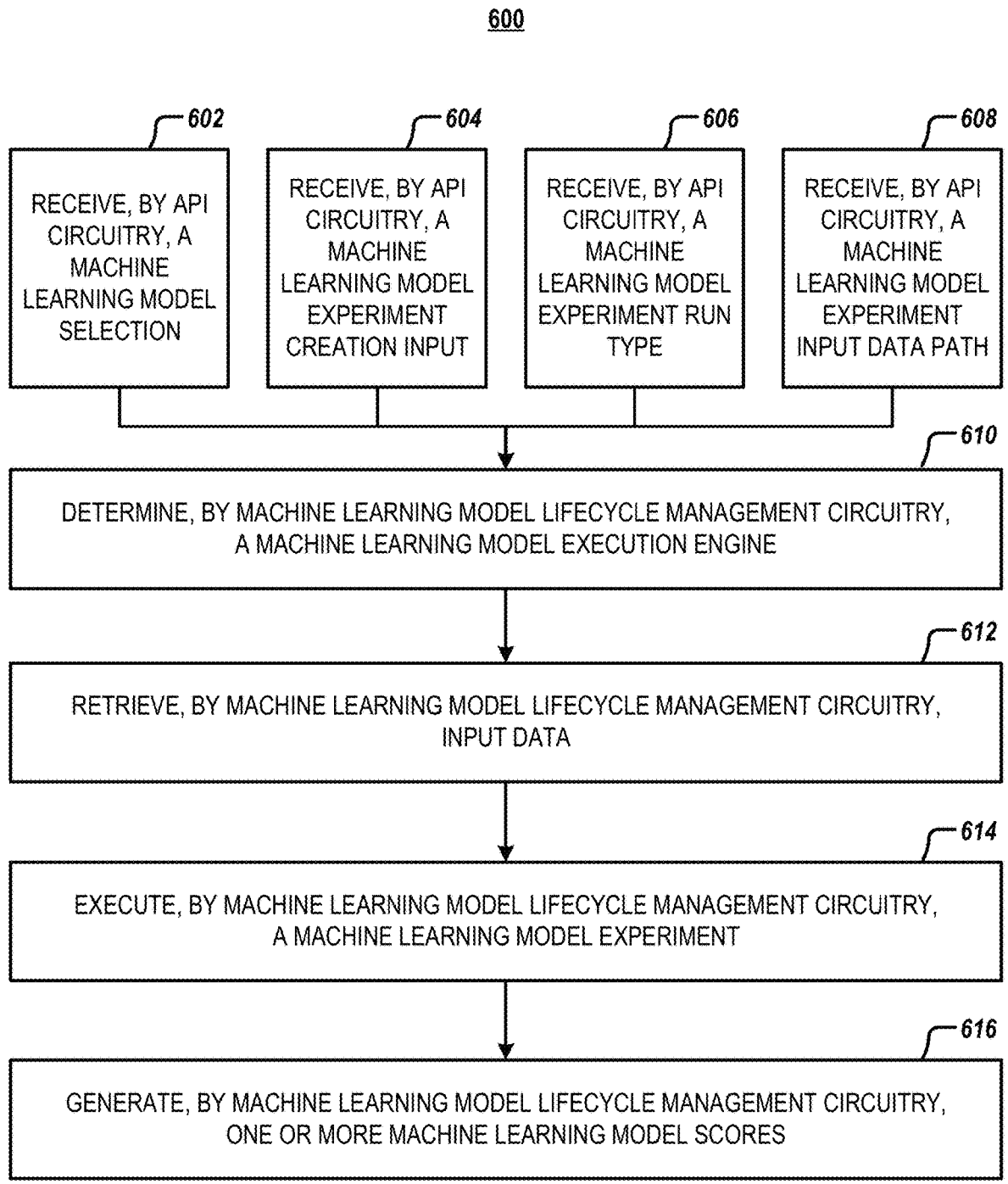
FIG. 6 illustrates an example machine learning model lifecycle management process in accordance with some example embodiments.
Figure 7:
FIG. 7 illustrates an example user interface display screen in accordance with some example embodiments.
Figure 8:
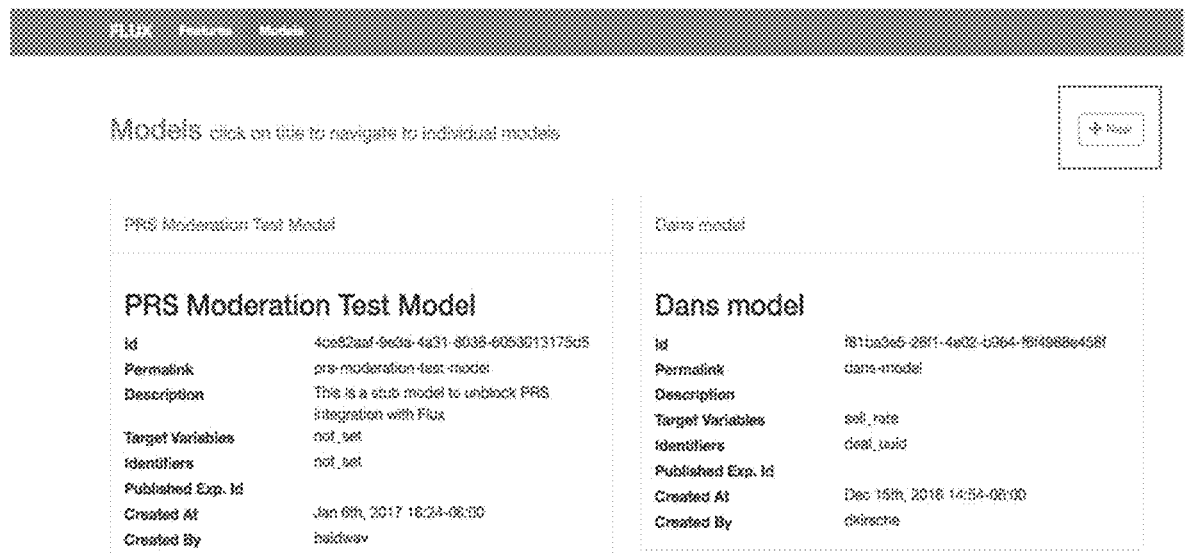
FIG. 8 illustrates an example user interface display screen in accordance with some example embodiments.
Figure 12:
FIG. 12 illustrates an example user interface display screen in accordance with some example embodiments.
Figure 13:
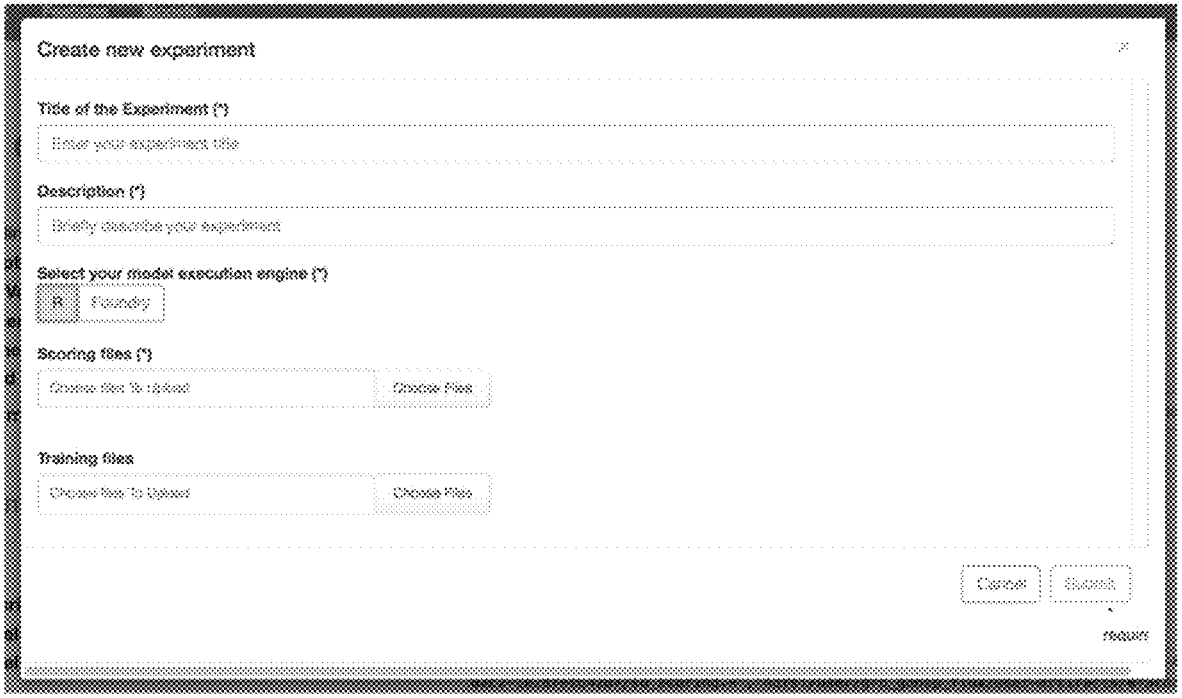
FIG. 13 illustrates an example user interface display screen in accordance with some example embodiments.
Figure 14:
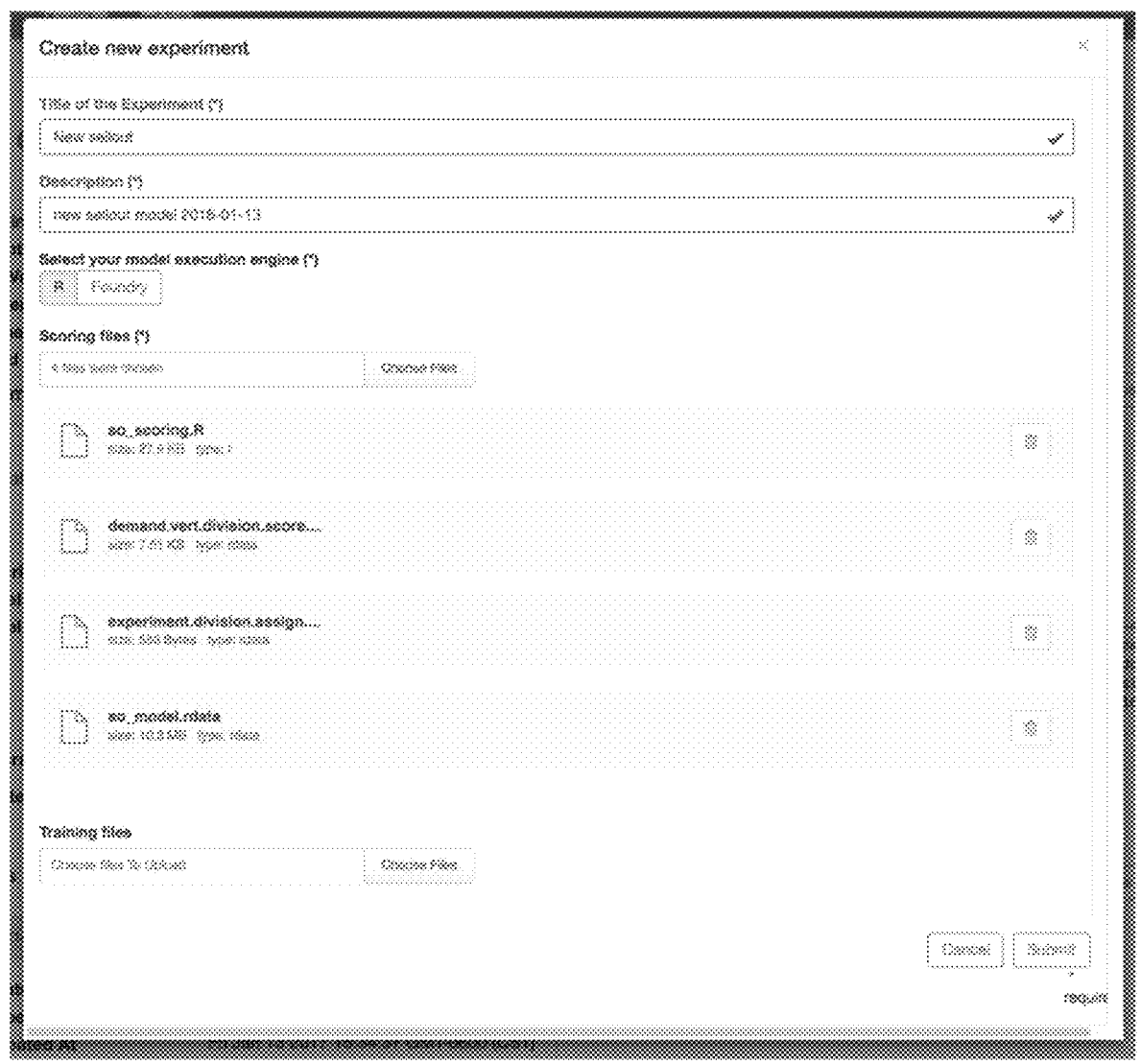
FIG. 14 illustrates an example user interface display screen in accordance with some example embodiments.
Figure 16:
FIG. 16 illustrates an example user interface display screen in accordance with some example embodiments.
Figure 18:
FIG. 18 illustrates an example user interface display screen in accordance with some example embodiments.

FIG. 6 illustrates an example flowchart 600 that contains example operations for managing a machine learning model lifecycle according to an example embodiment. The operations illustrated in FIG. 6 may, for example, be performed by one or more components described with reference to machine learning model lifecycle management system 102 shown in FIG. 1, by a computing device (e.g., user device 110, programmatic client device 112, remote server device 114, remote data storage device 116, client device 122, user device 170, client services 172) in communication with machine learning model lifecycle management system 102; by apparatus 200 shown in FIG. 2; by any other component described herein; or by any combination thereof. In some embodiments, the various operations described in connection with FIG. 6 may be performed by the apparatus 200 by or through the use of one or more of processing circuitry 202, memory 204, input-output circuitry 206, communications circuitry 208, API circuitry 210, machine learning model lifecycle management circuitry 212, batch execution circuitry 214, real-time execution circuitry 216, publishing circuitry 218, UI circuitry 220, and machine learning model training circuitry 222, any other suitable circuitry, or any combination thereof.

As shown by block 602, the apparatus 200 includes means, such as API circuitry 210 or the like, for receiving a machine learning model selection. In some embodiments, the apparatus 200 may receive the machine learning model selection from a computing device (e.g., user device 110, programmatic client device 112), UI circuitry (e.g., UI circuitry 220, Flux UI 128, Flux UI 178), or memory (e.g., memory 204) as described in more detail with reference to FIGS. 1-5 and 7-21.

As shown by block 604, the apparatus 200 includes means, such as API circuitry 210 or the like, for receiving a machine learning model experiment creation input. The machine learning model experiment creation input may comprise, for example, a machine learning model experiment name, a machine learning model experiment description, a machine learning model execution engine selection, at least one machine learning model scoring file, and at least one machine learning model scoring data file. In some embodiments, the apparatus 200 may receive the machine learning model experiment creation input from a computing device (e.g., user device 110, programmatic client device 112), UI circuitry (e.g., UI circuitry 220, Flux UI 128, Flux UI 178), or memory (e.g., memory 204) as described in more detail with reference to FIGS. 1-5 and 7-21.

As shown by block 606, the apparatus 200 includes means, such as API circuitry 210 or the like, for receiving a machine learning model experiment run type. The machine learning model experiment run type may be, for example, one of batch scoring, real-time scoring, or training. In some embodiments, the apparatus 200 may receive the machine learning model experiment run type from a computing device (e.g., user device 110, programmatic client device 112), UI circuitry (e.g., UI circuitry 220, Flux UI 128, Flux UI 178), or memory (e.g., memory 204) as described in more detail with reference to FIGS. 1-5 and 7-21.

As shown by block 608, the apparatus 200 includes means, such as API circuitry 210 or the like, for receiving a machine learning model experiment input data path. In some embodiments, the apparatus 200 may receive the machine learning model experiment input data path from a computing device (e.g., user device 110, programmatic client device 112), UI circuitry (e.g., UI circuitry 220, Flux UI 128, Flux UI 178), or memory (e.g., memory 204) as described in more detail with reference to FIGS. 1-5 and 7-21.

As shown by block 610, the apparatus 200 includes means, such as machine learning model lifecycle management circuitry 212 or the like, for determining a machine learning model execution engine based on the machine learning model execution engine selection and the machine learning model experiment run type. In some embodiments, the apparatus 200 may determine the machine learning model execution engine as described in more detail with reference to FIGS. 1-5 and 7-21.

As shown by block 612, the apparatus 200 includes means, such as machine learning model lifecycle management circuitry 212 or the like, for retrieving input data based on the machine learning model input data path. In some embodiments, the apparatus 200 may retrieve the input data as described in more detail with reference to FIGS. 1-5 and 7-21.

As shown by block 614, the apparatus 200 includes means, such as machine learning model lifecycle management circuitry 212 or the like, for executing a machine learning model experiment based on the machine learning model execution engine, the machine learning model scoring file, the at least one machine learning model scoring data file, and the input data. In some embodiments, the apparatus 200 may execute the machine learning model experiment as described in more detail with reference to FIGS. 1-5 and 7-21.

As shown by block 616, the apparatus 200 includes means, such as machine learning model lifecycle management circuitry 212 or the like, for generating, based on the machine learning model experiment, one or more machine learning model scores associated with the machine learning model experiment and the input data. In some embodiments, the apparatus 200 may generate the one or more machine learning model scores as described in more detail with reference to FIGS. 1-5 and 7-21.

In some embodiments, the operations described with reference to FIG. 6 (e.g., operations 602, 604, 606, 608, 610, 612, 614, 616) may not necessarily occur in the order shown in FIG. 6, and in some cases one or more of the operations shown in FIG. 6 may occur substantially simultaneously, or additional steps may be involved before, after, or between any of the operations shown in FIG. 6.

As noted above, computing systems, computing apparatuses, computing methods, and computer program products are described herein that manage machine learning model lifecycles. By doing so, users and clients are able to avoid the traditional problems surrounding machine learning model lifecycle management. For instance, through performance of the above operations, users may save time when exploring machine learning models due to the publication of the machine learning model experiment and the one or more machine learning model scores and further due to the simplified content exploration provided by the user interfaces described herein. Further, the user interfaces and data structures described herein simplify the navigation and searching of machine learning model scores and statistics and, in some instances, are more intuitive for users. Additionally, in some embodiments, the machine learning model lifecycle management system described herein improves the accuracy of machine learning prediction algorithms and the precision of recommendations (e.g., per single user) over traditional systems.

FIG. 6 thus illustrates a flowchart describing the operation of various computing systems (e.g., machine learning model lifecycle management system 102 described with reference to FIG. 1), computing apparatuses (e.g., apparatus 200 described with reference to FIG. 2), computing methods, and computer program products according to example embodiments contemplated herein. It will be understood that each operation of flowchart 600, and combinations of operations in flowchart 600, may be implemented by various means, such as hardware, firmware, processor, circuitry, and/or other devices associated with execution of software including one or more computer-executable program code instructions. For example, one or more of the procedures described above may be performed by execution of program code instructions. In this regard, the program code instructions that, when executed, cause performance of the procedures described above may be stored by a non-transitory computer-readable storage medium (e.g., memory 204) of a computing apparatus (e.g., apparatus 200) and executed by a processor (e.g., processing circuitry 202) of the computing apparatus. As will be appreciated, any such program code instructions may be loaded onto a computer or other programmable apparatus (e.g., hardware) to produce a machine, such that the resulting computer or other programmable apparatus implements the functions specified in the operations of flowchart 600. These program code instructions may also be stored in a computer-readable memory that may direct a computer or other programmable apparatus to function in a particular manner, such that the instructions stored in the computer-readable memory produce an article of manufacture, the execution of which implements the functions specified in the operations of flowchart 600. The program code instructions may also be loaded onto a computer or other programmable apparatus to cause a series of operations to be performed on the computer or other programmable apparatus to produce a computer-implemented process such that the instructions executed on the computer or other programmable apparatus provide operations for implementing the functions specified in the operations of flowchart 600.

The flowchart operations described with reference to FIG. 6 support combinations of means for performing the specified functions and combinations of operations for performing the specified functions. It will be understood that one or more operations of the flowchart, and combinations of operations in the flowchart, may be implemented by special purpose hardware-based computer systems which perform the specified functions, or combinations of special purpose hardware and computer instructions.

Use Case

Having described example embodiments in general terms, the following example embodiments are provided to further illustrate a use case of some example embodiments. In some instances, the following example embodiments provide examples of how the machine learning model lifecycle management system disclosed herein may manage the lifecycles of machine learning models. In some instances, the following example embodiments provide examples of the ways in which the machine learning model lifecycle management system disclosed herein may generate user interface data based on the various data or electronic information disclosed herein.

"Flux" Use Case

"Flux" is an illustrative example use case wherein the machine learning model lifecycle management system disclosed herein may generate an interactive user interface application referred to herein as "Flux" and described in greater detail below with reference to FIGS. 7-21.

Recent years have seen a boom in machine learning applications in many aspects of the information technology industry. To facilitate these applications, automated, scalable machine learning infrastructures are being developed at many companies. As machine learning becomes the driving force of the daily operation of companies within the information technology sector, infrastructure that enables automated, scalable machine learning is a core component of the systems of many large companies. Various systems and products are being built, offered, and open sourced. Numerous aspects of an e-commerce company's business may be driven by machine learning.

One great challenge of these machine learning systems is the integration of offline model prototypes into online production environments. Oftentimes, the tools used by data scientists who develop model prototypes are different from and sometimes incompatible with the production systems. A typical way to address this problem is to undergo a manual process that re-implements models built with research tools, with libraries that are compatible with production systems. However, this presents challenges for both data scientists and engineering teams since it is time-consuming and prone to errors.

Another problem is that the contract between data scientists and engineers constantly evolves over time. On the one hand, in the development stage of machine learning algorithms, fast prototyping and parameter tuning needs short feedback loops. A data scientist may decide to add or drop certain features, or build the model with another algorithm, or change the format of the target variable on a very frequent cadence. On the other hand, the engineering team that is responsible for generating input for or consuming the output of the model want the model to be stable, and might need to update their services to accommodate changes to the model when they happen. To avoid production issues, careful planning and coordination may be necessary. A good machine learning infrastructure may need to have a mechanism that versions the contract, enabling fast iteration while facilitating the maintenance of a stable production environment.

Furthermore, depending on the use case, an offline batch execution, or a real-time or streaming paradigm might be desired. A machine learning system may need to support both paradigms. A machine learning system also needs to be easily scalable, since the load may vary drastically in certain scenarios. A good machine learning platform should also be extensible. Machine learning is evolving at a rapid pace, and libraries and frameworks can appear and become outdated quickly. Depending on their background, data scientists might prefer different libraries, languages, or both. A well-designed platform should be able to onboard new machine learning libraries with ease. In addition, a machine learning infrastructure should provide functionalities such as monitoring and archiving. These functionalities will enable key activities such as AB testing of models and offline analytics.

Traditional systems present too much hindrance in integrating with a company's internal systems and thus may not be suitable for the company's purpose. In addition, traditional systems may be tied to a specific library and thus the range of supported algorithms may be limited. For example, some traditional frameworks are built for particular libraries, such as Spark MLlib and H2O Steam, and can be difficult to extend. Both Spark MLlib and H2O Steam rely on specific algorithm implementations and thus it can be costly and difficult to onboard other libraries.

In contrast to traditional systems, Flux is a computing system that solves these problems of machine learning model productionization by providing a set of tools and services for managing the lifecycle of these models, including execution of training and scoring. Flux provides REST APIs for programmatic access to models and their executions. Flux supports multiple model engines and offers great flexibility for model prototyping. Model execution may be done in batch or real-time modes. In addition, Flux integrates machines learning models into the production system and provides monitoring and archiving for the models. Further, Flux solves the scalability issue and provides a seamless collaboration between data scientists and engineers. Flux expedites the deployment, execution, and monitoring of machine learning models. Flux focuses on enabling data scientists to build model prototypes with languages and tools they are most proficient in, and integrating the models into the enterprise production system. Flux manages the lifecycle of deployed models, and executes them in distributed batch mode, or exposes them as microservices for real-time use cases. Flux's design focuses on automation and improved management, scalability, and extensibility. Flux is the central system for supervised machine learning tasks and has been supporting multiple teams. For example, Flux has productionized twenty models of seven teams and onboarded additional clients. These models have been utilized in many important areas of company operations, such as demand prediction and lead scoring. Typical algorithms include generalized linear models and decision tree ensembles such as random forest and gradient boosting decision trees. In some embodiments, Flux may not provide feature engineering as a separate stage in the pipeline at a system level, but rather Flux may leave feature engineering to individual model implementations.

In some embodiments, to ease the interaction with the machine learning model lifecycle management system for users of user devices, the machine learning model lifecycle management system may comprise a "Flux" user interface (e.g., Flux UI 128, Flux UI 178). The user interface may provide functionalities that allow clients to create Models, Experiments, and Runs, and publish and delete Experiments. The user interface may also present information about each Run, where key events (e.g., start, end, success, and failure) are logged. In one illustrative example, the user interface may be used by data scientist clients who need more user-friendly interfaces.

FIGS. 7-21 illustrate various example user interface display screens 700, 800, 900, 1000, 1100, 1200, 1300, 1400, 1500, 1600, 1700, 1800, 1900, 2000, and 2100 in accordance with some example embodiments. It is also noted that all or some of the information presented by the example user interface display screens discussed herein may be based on data that is received, generated and/or maintained by one or more components of apparatus 200, such as UI circuitry 220. In some embodiments, one or more external systems (e.g., a remote cloud computing and/or data storage system) may also be leveraged to provide at least some of the functionality discussed herein. For example, FIG. 21 shows a screenshot of the Flux UI showing a Model, an Experiment, and a list of batch scoring Runs.

In some embodiments, data science teams may use Flux to quickly iterate and improve on models that have already been productionized. Systems that consume machine learning model outputs may integrate with Flux without the need to delve into details of how certain model works. Both data science teams and engineering teams have enjoyed multiple benefits from the Flux platform. Using Flux, machine learning model productionization that used to take weeks, if not months, now only takes a few days to happen. In one illustrative example, the batch execution engine has enabled high-throughput model prediction that was unattainable in single-box environments. For example, Flux has reduced the prediction time of one model for 14 million feature vectors from 14 hours down to 1.5 hours, which is critical for the model to be practically useful in production. In another illustrative example, the real-time execution engine has made fast prediction possible for models that requires low latency. Depending on the specific algorithm and implementation, the response time may vary, but the real-time execution engine adds only a small overhead to the model prediction, typically tens of to a few hundred milliseconds.

There are many advantages of these and other embodiments described herein. For example, Flux provides cleaner seams between data scientists and engineers. In addition, Flux infrastructure is not tied to a specific library and does not limit the range of algorithms that it supports. For example, Flux's extensible architecture currently supports models that are defined in Cognitive Foundry (a Java machine learning library), or models that are implemented in R (with access to the vast number of libraries available in R). Accordingly, Flux provides a large subset of features and presents reduced hindrance in integrating with a company's internal systems. Further, Flux provides generic, extensible support for machine learning and is not tied to a specific library. Accordingly, the range of algorithms supported by Flux is not limited. Further still, Flux is designed to be easily extensible. To onboard new machine learning algorithms and libraries, only a small set of interfaces, and in some instances an adapator, need to be implemented.

CONCLUSION

While various embodiments in accordance with the principles disclosed herein have been shown and described above, modifications thereof may be made by one skilled in the art without departing from the teachings of the disclosure. The embodiments described herein are representative only and are not intended to be limiting. Many variations, combinations, and modifications are possible and are within the scope of the disclosure. Alternative embodiments that result from combining, integrating, and/or omitting features of the embodiment(s) are also within the scope of the disclosure. Accordingly, the scope of protection is not limited by the description set out above, but is defined by the claims which follow, that scope including all equivalents of the subject matter of the claims. Each and every claim is incorporated as further disclosure into the specification and the claims are embodiment(s) of the present disclosure. Furthermore, any advantages and features described above may relate to specific embodiments, but shall not limit the application of such issued claims to processes and structures accomplishing any or all of the above advantages or having any or all of the above features.

In addition, the section headings used herein are provided for consistency with the suggestions under 37 C.F.R. § 1.77 or to otherwise provide organizational cues. These headings shall not limit or characterize the disclosure set out in any claims that may issue from this disclosure. For instance, a description of a technology in the "Background" is not to be construed as an admission that certain technology is prior art to any disclosure in this disclosure. Neither is the "Summary" to be considered as a limiting characterization of the disclosure set forth in issued claims. Furthermore, any reference in this disclosure to "disclosure" or "embodiment" in the singular should not be used to argue that there is only a single point of novelty in this disclosure. Multiple embodiments of the present disclosure may be set forth according to the limitations of the multiple claims issuing from this disclosure, and such claims accordingly define the disclosure, and their equivalents, that are protected thereby. In all instances, the scope of the claims shall be considered on their own merits in light of this disclosure, but should not be constrained by the headings set forth herein.

Also, techniques, systems, subsystems, and methods described and illustrated in the various embodiments as discrete or separate may be combined or integrated with other systems, modules, techniques, or methods without departing from the scope of the present disclosure. Other devices or components shown or discussed as coupled to, or in communication with, each other may be indirectly coupled through some intermediate device or component, whether electrically, mechanically, or otherwise. Other examples of changes, substitutions, and alterations are ascertainable by one skilled in the art and could be made without departing from the scope disclosed herein.

Many modifications and other embodiments of the disclosure set forth herein will come to mind to one skilled in the art to which these embodiments pertain having the benefit of teachings presented in the foregoing descriptions and the associated figures. Although the figures only show certain components of the apparatus and systems described herein, it is understood that various other components may be used in conjunction with the machine learning model lifecycle management system. Therefore, it is to be understood that the disclosure is not to be limited to the specific embodiments disclosed and that modifications and other embodiments are intended to be included within the scope of the appended claims. For example, the various elements or components may be combined, rearranged, or integrated in another system or certain features may be omitted or not implemented. Moreover, the steps in any method described above may not necessarily occur in the order depicted in the accompanying drawings, and in some cases one or more of the steps depicted may occur substantially simultaneously, or additional steps may be involved. Although specific terms are employed herein, they are used in a generic and descriptive sense only and not for purposes of limitation.

The invention claimed is:

1. An apparatus comprising a processor and a non-transitory memory storing program instructions, wherein the non-transitory memory and the program instructions are configured to, with the processor, cause the apparatus to:
    receive a first user selection of a machine learning model experiment creation button on a machine learning model user interface rendered on a client device;
    cause rendering, on the client device, a machine learning model experiment creation user interface comprising a machine learning model experiment name input field, a machine learning model experiment description input field, a machine learning model execution engine selection field, and a machine learning model scoring file upload field;
    receive, via the machine learning model experiment creation user interface, machine learning model experiment creation input comprising a machine learning model experiment name, a machine learning model experiment description, a machine learning model execution engine selection, and a machine learning model scoring file;
    cause rendering, on the client device, a machine learning model experiment user interface based at least in part on the machine learning model experiment creation input; and
    in response to receiving a second user selection of a machine learning model experiment run creation button on the machine learning model experiment user interface, cause rendering, on the client device, a machine learning model experiment run creation user interface comprising a machine learning model experiment run selection field and a machine learning model input data path input field.

2. The apparatus of claim 1, wherein the non-transitory memory and the program instructions are configured to, with the processor, cause the apparatus to:
    receive, via the machine learning model experiment run creation user interface, a machine learning model experiment run type and a machine learning model input data path, wherein the machine learning model experiment run type is one of batch scoring or training.

3. The apparatus of claim 2, wherein the non-transitory memory and the program instructions are configured to, with the processor, cause the apparatus to:
    determine a machine learning model execution engine based on the machine learning model execution engine selection and the machine learning model experiment run type; and
    retrieve input data based on the machine learning model input data path.

4. The apparatus of claim 3, wherein the non-transitory memory and the program instructions are configured to, with the processor, cause the apparatus to:
    execute a machine learning model experiment based on the machine learning model execution engine, the machine learning model scoring file, and the input data.

5. The apparatus of claim 4, wherein the non-transitory memory and the program instructions are configured to, with the processor, cause the apparatus to:
    generate one or more machine learning model scores based on the machine learning model experiment, wherein the one or more machine learning model scores are associated with the machine learning model experiment and the input data.

6. The apparatus of claim 5, wherein the one or more machine learning model scores comprise one or more score statistics, and wherein each score statistic of the one or more machine learning model scores comprises a feature identifier, a score timestamp, a score, and an experiment identifier.

7. A computer-implemented method comprising:
    receiving a first user selection of a machine learning model experiment creation button on a machine learning model user interface rendered on a client device;
    causing rendering, on the client device, a machine learning model experiment creation user interface comprising a machine learning model experiment name input field, a machine learning model experiment description input field, a machine learning model execution engine selection field, and a machine learning model scoring file upload field;
    receiving, via the machine learning model experiment creation user interface, machine learning model experiment creation input comprising a machine learning model experiment name, a machine learning model experiment description, a machine learning model execution engine selection, and a machine learning model scoring file;

causing rendering, on the client device, a machine learning model experiment user interface based at least in part on the machine learning model experiment creation input; and in response to receiving a second user selection of a machine learning model experiment run creation button on the machine learning model experiment user interface, causing rendering, on the client device, a machine learning model experiment run creation user interface comprising a machine learning model experiment run selection field and a machine learning model input data path input field.

8. The computer-implemented method of claim 7, further comprises:

receiving, via the machine learning model experiment run creation user interface, a machine learning model experiment run type and a machine learning model input data path, wherein the machine learning model experiment run type is one of batch scoring or training.

9. The computer-implemented method of claim 8, further comprising:

determining a machine learning model execution engine based on the machine learning model execution engine selection and the machine learning model experiment run type; and retrieving input data based on the machine learning model input data path.

10. The computer-implemented method of claim 9, further comprising:

executing a machine learning model experiment based on the machine learning model execution engine, the machine learning model scoring file, and the input data.

11. The computer-implemented method of claim 10, further comprising:

generating one or more machine learning model scores based on the machine learning model experiment, wherein the one or more machine learning model scores are associated with the machine learning model experiment and the input data.

12. The computer-implemented method of claim 11, wherein the one or more machine learning model scores comprise one or more score statistics, and wherein each score statistic of the one or more machine learning model scores comprises a feature identifier, a score timestamp, a score, and an experiment identifier.

13. A computer program product comprising at least one non-transitory computer-readable storage medium having computer-readable program code portions stored therein, the computer-readable program code portions comprising an executable portion configured to:

receive a first user selection of a machine learning model experiment creation button on a machine learning model user interface rendered on a client device;

cause rendering, on the client device, a machine learning model experiment creation user interface comprising a machine learning model experiment name input field, a machine learning model experiment description input field, a machine learning model execution engine selection field, and a machine learning model scoring file upload field;

receive, via the machine learning model experiment creation user interface, machine learning model experiment creation input comprising a machine learning model experiment name, a machine learning model experiment description, a machine learning model execution engine selection, and a machine learning model scoring file;

cause rendering, on the client device, a machine learning model experiment user interface based at least in part on the machine learning model experiment creation input; and in response to receiving a second user selection of a machine learning model experiment run creation button on the machine learning model experiment user interface, cause rendering, on the client device, a machine learning model experiment run creation user interface comprising a machine learning model experiment run selection field and a machine learning model input data path input field.

14. The computer program product of claim 13, wherein the computer-readable program code portions comprise the executable portion configured to:

receive, via the machine learning model experiment run creation user interface, a machine learning model experiment run type and a machine learning model input data path, wherein the machine learning model experiment run type is one of batch scoring or training.

15. The computer program product of claim 14, wherein the computer-readable program code portions comprise the executable portion configured to:

determine a machine learning model execution engine based on the machine learning model execution engine selection and the machine learning model experiment run type; and retrieve input data based on the machine learning model input data path.

16. The computer program product of claim 15, wherein the computer-readable program code portions comprise the executable portion configured to:

execute a machine learning model experiment based on the machine learning model execution engine, the machine learning model scoring file, and the input data.

17. The computer program product of claim 16, wherein the computer-readable program code portions comprise the executable portion configured to:

generate one or more machine learning model scores based on the machine learning model experiment, wherein the one or more machine learning model scores are associated with the machine learning model experiment and the input data.

* * * * *